(12) United States Patent
Kuyper et al.

(10) Patent No.: US 10,669,028 B1
(45) Date of Patent: Jun. 2, 2020

(54) SYSTEM AND METHOD FOR DETECTING ITEMS IN AIRCRAFT STOWAGE AREAS

(71) Applicant: Rockwell Collins, Inc., Cedar Rapids, IA (US)

(72) Inventors: John R. Kuyper, Winston Salem, NC (US); Ian L. Frost, Winston-Salem, NC (US); Shirley E. Govea Bravo, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/259,641

(22) Filed: Jan. 28, 2019

(51) Int. Cl.
  *B64D 11/00* (2006.01)
  *G08B 21/24* (2006.01)
  *G06Q 50/30* (2012.01)

(52) U.S. Cl.
  CPC ............ *B64D 11/003* (2013.01); *G08B 21/24* (2013.01); *G06Q 50/30* (2013.01)

(58) Field of Classification Search
  CPC .............................. B64D 11/003; G08B 21/24
  See application file for complete search history.

(56) References Cited

U.S. PATENT DOCUMENTS

| | | | | |
|---|---|---|---|---|
| 9,033,279 | B2* | 5/2015 | Graf | B64D 11/003 244/118.5 |
| 10,189,406 | B1* | 1/2019 | Pozzi | B60R 5/00 |
| 2008/0055836 | A1* | 3/2008 | Lamoree | B64D 11/003 361/837 |
| 2016/0109280 | A1* | 4/2016 | Tiu | G01D 7/00 702/173 |
| 2017/0328759 | A1* | 11/2017 | Nicks | B64D 11/003 |
| 2018/0086464 | A1* | 3/2018 | Riedel | G06T 7/70 |
| 2018/0202792 | A1* | 7/2018 | Hamabe | B64D 11/00 |
| 2018/0257784 | A1* | 9/2018 | Simms | B64D 45/00 |
| 2019/0212183 | A1* | 7/2019 | Zajac | G01G 19/08 |
| 2019/0233113 | A1* | 8/2019 | Carswell | B64D 11/003 |

FOREIGN PATENT DOCUMENTS

WO        2008128083 A2    10/2008

* cited by examiner

*Primary Examiner* — Hongmin Fan
(74) *Attorney, Agent, or Firm* — Suiter Swantz pc llo

(57) ABSTRACT

A system for identifying forgotten items is disclosed. In embodiments, the system includes one or more item detectors. The item detectors may be configured to determine a calibration value of a stowage area in a calibration mode, and further configured to determine a check value of the stowage area in a check mode. The system also includes a controller configured to receive the calibration value and the check value, calculate a difference value between the calibration value and the check value, and compare the difference value to a threshold value. If the difference value is greater than the threshold value, the controller is further configured to generate one or more found item signals which indicate the presence of a found forgotten item.

20 Claims, 20 Drawing Sheets

SYSTEM AND METHOD FOR DETECTING ITEMS IN AIRCRAFT STOWAGE AREAS

BACKGROUND

Noon Following long flights, aircraft passengers are often tired, disoriented, and anxious to disembark the aircraft. It is extremely common for aircraft passengers to forget and leave personal belongings on the aircraft when disembarking, including jewelry, phones, wallets, headphones, and the like. Items are frequently left below the seat, within a seat pocket, or in the over-head compartment. The numerous storage areas found in Super First Class suites only compound this problem, as items may be left in any one of numerous stowage areas.

Most airlines have enacted safety procedures which provide that once a passenger has stepped off an aircraft, they are not allowed back on. Even if a passenger realizes they have forgotten a personal belonging while on the jet bridge, they are not allowed to return to the aircraft to retrieve it. If aircraft personnel are unable, or unwilling, to retrieve the personal belonging, it will be picked up by the aircraft cleaning crew and taken to a lost and found after all passengers have disembarked the aircraft. If the personal belonging may be positively identified (e.g., by name, phone number, address, etc.), the passenger may be identified and the personal belonging may be shipped to the passenger's address. On the other hand, if personal belongings are not able to be positively identified, retrieving the personal belonging from lost and found may be a long, arduous process. Phone calls often go un-answered, voicemails go un-returned, and there is often no employee attending the lost and found desk. Unclaimed items may be kept at the airport for several days or weeks, at which point they are sold or donated.

Therefore, it would be desirable to provide a system and method that cure one or more of the issues identified above.

SUMMARY

In one aspect, embodiments of the present disclosure are directed to a forgotten item detection system. In embodiments, the system may include one or more item detectors configured to determine a calibration value of a stowage area in a calibration mode, and determine a check value of the stowage area in a check mode. The system may further include a controller configured to: receive the calibration value and the check value from the one or more item detectors; calculate a difference value between the calibration value and the check value; compare the difference value to a threshold value; and generate one or more found item signals if the difference value is greater than the threshold value.

In another aspect, embodiments of the present disclosure are directed to a forgotten item detection system. In embodiments, the system may include a passenger cabin. The system may further include a plurality of stowage areas in the passenger cabin, at least one stowage area of the plurality of stowage areas including one or more item detectors, the one or more item detectors configured to determine a calibration value of the at least one stowage area in a calibration mode, and determine a check value of the at least one stowage area in a check mode. The system may further include a controller configured to: receive the calibration value and the check value from the one or more item detectors; calculate a difference value between the calibration value and the check value; compare the difference value to a threshold value; and generate one or more found item signals if the difference value is greater than the threshold value.

In a further aspect, embodiments of the present disclosure are directed to a method for identifying forgotten items in a stowage area. In embodiments, the method may include: determining a calibration value of a stowage area with an item detector in a calibration mode; determining a check value of the stowage area with the item detector in a check mode; calculating a difference value between the calibration value and the check value; comparing the difference value to a threshold value; identifying a found item within the stowage area if the difference value is greater than the threshold value; and reporting the found item with a display.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
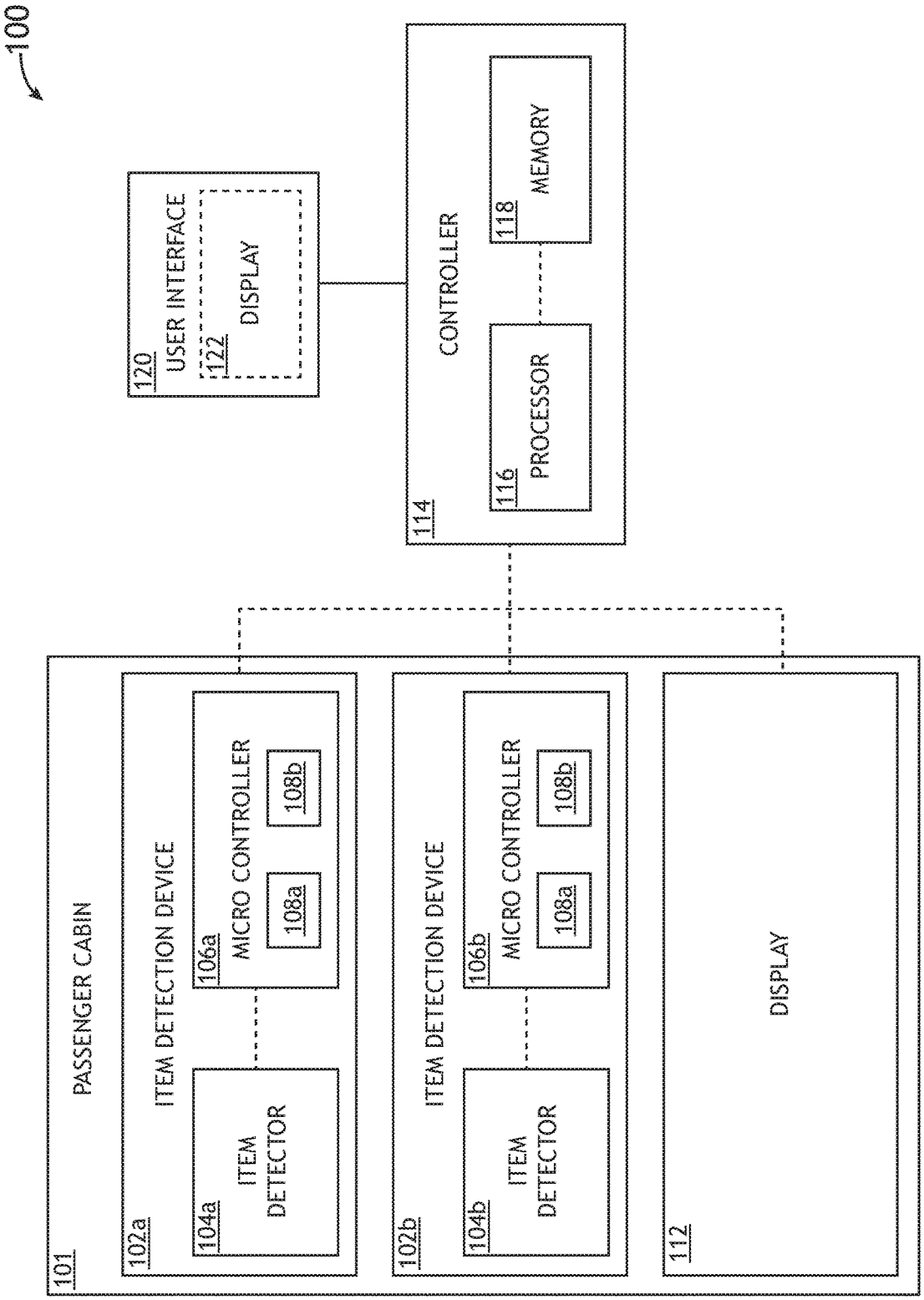
FIG. 1 illustrates a system for identifying items in a stowage area, in accordance with an example embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Additionally, as used herein, a letter following a reference numeral is intended to reference an embodiment of the feature or element that may be similar, but not necessarily identical, to a previously described element or feature bearing the same reference numeral (e.g., 1, 1A, 1B). Such shorthand notations are used for purposes of convenience only, and should not be construed to limit the inventive concepts disclosed herein in any way unless expressly stated to the contrary.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the present disclosure are directed to a system configured to identify items in a stowage area.

Aircraft passengers frequently forget and leave personal belongings on an aircraft when disembarking an aircraft. Inadvertently forgotten personal belongings may include, but are not limited to, jewelry, phones, passports, wallets, and headphones. The numerous stowage areas provided in Super First Class suites provide additional areas aircraft passengers to check, thereby compounding the issue of forgotten and left personal belongings.

Many passengers may realize that they forgot a personal belonging shortly after disembarking the aircraft. However, most airline safety procedures prohibit a passenger from returning to the aircraft once disembarking. If aircraft personnel are unable, or unwilling, to retrieve the personal belonging, airline and airport procedures often make it extremely difficult, or even impossible, for the passenger to reclaim the item. As such, there exists a need for a system and method which cure one or more of these issues.

Referring generally to FIGS. 1-10, a system and method for identifying items in a stowage are described, in accordance with example embodiments of the present disclosure.

Embodiments of the present disclosure are directed to a system for identifying items within a stowage area. More particularly, embodiments of the present disclosure are directed to a system of item detectors configured to identify forgotten items in a stowage area of an aircraft passenger compartment. Additional embodiments of the present disclosure are directed to one or more displays which may inform passengers and/or aircraft personnel as to the existence of a forgotten item prior to passengers disembarking an aircraft.

FIG. 1 illustrates a system 100 for identifying items in a passenger cabin 101, in accordance with an example embodiment of the present disclosure. The system 100 may include, but is not limited to, one or more item detection devices 102, a display 112, a controller 114 including one or more processors 116 and a memory, a user interface 120, and a display 122. It is contemplated herein that the passenger cabin 101 may include any passenger cabin in the art including, but not limited to, an aircraft passenger cabin, a bus passenger cabin, a train/subway passenger cabin, and the like.

In one embodiment, a passenger cabin 101 may include one or more item detection devices 102 and one or more displays 112. The one or more displays 112 may be configured to display one or more characteristics of system 100 to a user. It is contemplated herein that the passenger cabin 101 may include one or more stowage areas within which passengers (e.g., aircraft passengers, train passengers, and the like) may stow items. In this regard, it is contemplated that a first stowage area of passenger cabin 101 may include one or more item detection devices 102, a second stowage area of passenger cabin 101 may include one or more item detection devices 102, and the like. For instance, as shown in FIG. 1, a first stowage area of passenger cabin 101 may include a first item detection device 102a, and a second stowage area of passenger compartment 101 may include a second item detection device 102.

The one or more displays 112 of passenger cabin 101 may include any display 112 configured to convey information of system 100 to a user (e.g., passengers, aircraft personnel, and the like). For example, the one or more displays 112 may include a light-emitting diode (LED) based display, an organic light-emitting diode (OLED) based display, a CRT display, and the like. By way of another example, the display 112 may simply include an LED light, a blinking light, or the like.

The one or more item detection devices 102 may be configured to identify items within a stowage area. For example, upon forgetting a wallet or other personal belonging within a stowage area of an aircraft, the one or more item detection devices 102 may be configured to identify the wallet or other personal belonging as being left or forgotten within the stowage area. As it is used herein, the term "stowage area" may be regarded as referring to any area or compartment configured to store items and personal belongings. For example, in the context of an aircraft passenger cabin, a stowage area may include, but is not limited to, an over-head compartment, a seat pocket, a wardrobe, a drawer, a credenza pocket, an under-seat stowage area (e.g., vanity stowage area), an ottoman stowage area, a seat back pocket, and the like. For instance, referring to FIG. 1, the first item detection device 102a may be configured to detect items within an over-head compartment, and the second item detection device 102b may be configured to detect items within an ottoman stowage area.

In this regard, the one or more item detectors 104 of the item detection devices 102 may include any detectors known in the art for identifying an item within a stowage area. For example, item detectors 104 may include, but are not limited to, cameras, ultrasonic sensors, scanning lasers, strain gauges, force sensor resistors, light detectors, and the like. By way of another example, the one or more item detectors 104 may include inductive sensors configured to identify an item by measuring changes in magnetic fields caused by the item. By way of another example, the one or more item detectors 104 may include hall effect sensors or capacitive sensors. By way of another example, the one or more item detectors 104 may include reed switches, inclinometers, or photoelastic sensors configured to detect deflection in a supporting structure caused by the presence of an item. By way of another example, the one or more item detectors 104 may include level sensors or linear encoders. By way of another example, the one or more item detectors 104 may include gravimeters configured to measure a change in the gravimetric field caused by an item. Various exemplary types of item detectors 104 will be discussed in further detail herein.

The one or more item detectors 104 of item detection device 102 may be communicatively coupled to one or more microcontrollers 106. A microcontroller 106 may include one or more processors 108 and a memory 110. The one or more processors 108 of microcontroller 106 may be configured to execute a set of program instructions stored in memory 110, the set of program instructions configured to cause the one or more processors 108 to carry out various steps of the present disclosure.

The one or more processors 108 may be configured to cause the item detectors 104 to determine a calibration value of a stowage area while system 100 is in a calibration mode. The one or more processors 108 may be further configured to cause the item detectors 104 to determine a check value of a stowage area while system 100 is in a check mode. The one or more processors 108 may be further configured to receive the calibration value and the check value from the item detectors 104. The one or more processors 108 may be further configured to save the calibration value and the check value in memory 110. The one or more processors 108 may be configured to calculate a difference value between the calibration value and the check value, and store the difference value in memory 110. The one or more processors 108 may be further configured to compare the difference value to a threshold value. The one or more processors 108 may be further configured to generate one or more found item signals if the difference value is greater than the threshold value.

Figure 2:
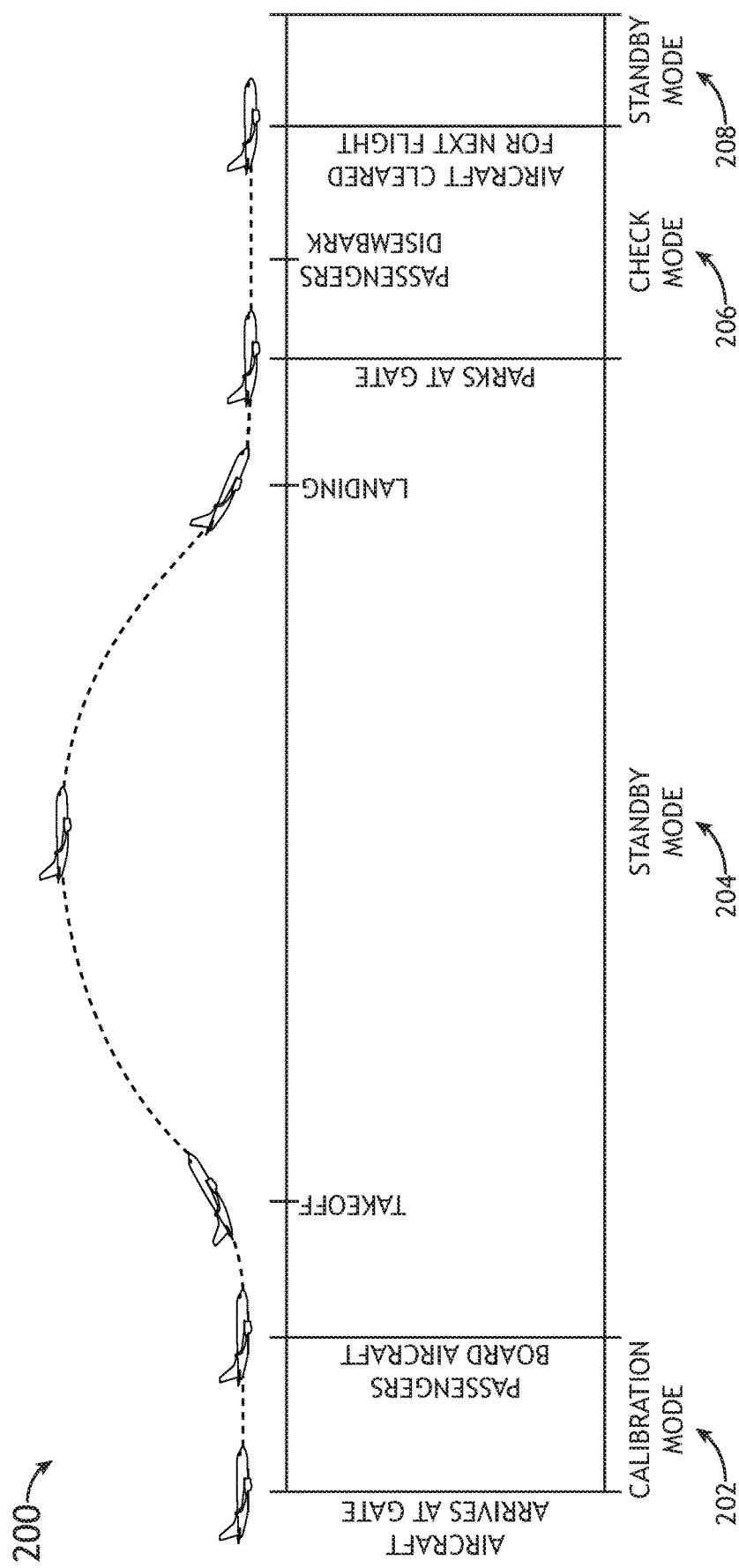
FIG. 2 depicts a graph 200 illustrating the various operational states of system 100, in accordance with one or more embodiments of the present disclosure.

The various operational states of system 100, including "calibration mode," "check mode," and "standby mode" may be better understood with reference to FIG. 2.

FIG. 2 depicts a graph 200 illustrating the various operational states of system 100, in accordance with one or more embodiments of the present disclosure. In particular, graph 200 illustrates various operational states of system 100 applied in an aviation context, including a calibration mode 202, standby mode 204, check mode 206, and standby mode 208. Accordingly, graph 200 is provided solely for illustrative purposes, and is not to be regarded as limiting.

As it is used herein, the term "calibration mode" may be used to refer to an operational state in which no personal belongings or other items are expected to be within stowage areas of the passenger cabin 101. For example, in an aircraft setting, system 100 may be in a calibration mode 202 between the time the aircraft arrives at a gate and before any passengers have boarded the aircraft. At this time, it would be expected that no personal belongings or other items belonging to passengers would be present within various stowage areas of the passenger cabin 101 of the aircraft. In this regard, a "calibration value" may be regarded as a measurement, image, reading, or other value which is collected during the calibration mode 202 and which will serve as a "base line" from which to compare subsequent measurements, images, or readings (e.g., "check values").

Conversely, as it is used herein, the term "check mode" may be used to refer to an operational state in which system 100 is configured to ensure that items and personal belongings have been removed from stowage areas of the passenger cabin 101. For example, returning to the aircraft setting, system 100 may be in a check mode 206 between the time the aircraft arrives at a gate until the time which the aircraft is cleared for the next flight. During this time period, passengers are expected to collect their personal belongings as they prepare to disembark the aircraft. Accordingly, the terms "check mode" and "disembark mode" may be used interchangeably. Any items which remaining in a stowage area during the check mode would be identified by system 100. In this regard, a "check value" determined during a check mode 206 may be regarded as a measurement, image, reading, or other value which may be compared against calibration values in order to identify items left within stowage areas.

Furthermore, as it is used herein, the term "standby mode" may be used to refer to an operational state in which item detectors 104 are inactive or otherwise not configured to collect data. For example, continuing with the aircraft setting, system 100 may be in a standby mode 204 during the period of time in which passengers are boarding the aircraft, during flight, and while taxiing to a gate following landing. Additionally, the aircraft 208 may be in a standby mode 208 between the time the aircraft has been cleared for the next flight and the time when the aircraft arrives at the gate for the next flight.

It is noted herein that the relative lengths of time illustrated in FIG. 2 are solely for illustrative purposes. For example, the calibration mode 202 may last only a sufficient amount of time to collect data for a calibration value. For instance, calibration mode 202 may last only several seconds.

It is noted herein that the form of "calibration values" and "check values" determined during calibration modes and check modes may vary depending on the type of item detector 104 being utilized. For example, in embodiments where an item detector 104 comprises a camera, the calibration values and check values of the item detector 104 (e.g., camera) may comprise images obtained during a calibration mode and a check mode, respectively. By way of another example, in embodiments where an item detector 104 comprises a light detector including a phototransistor, the calibration values and check values of the item detector 104 (e.g., light detector including a phototransistor) may comprise phototransistor voltage readings obtained during a calibration mode and a check mode, respectively. Various forms of item detectors 104 and associated calibration/check values will be discussed in further detail herein.

It is further contemplated herein that system 100 may transition between various operational states of system 100 (e.g., calibration mode, check mode, standby mode, and the like) automatically and/or in response to manual input commands. This may be further understood with reference to FIG. 1.

As shown in FIG. 1, the one or more item detection devices 102a, 102b and the one or more displays 112 of the passenger cabin 101 may be communicatively coupled to a controller 114. The controller 114 may include one or more processors 116 and a memory 118, wherein the one or more processors 116 are configured to execute a set of program instructions stored in memory 118, the program instructions configured to cause the one or more processors 116 to carry out various functions of the present disclosure. In embodiments, the controller 114 may be communicatively coupled to a user interface 120. The user interface 120 may include a display 122 configured to display one or more characteristics of system 100 to a user.

It is contemplated herein that the one or more processors 116 may be configured to set the operational state of system 100 (e.g., set system to calibration mode, check mode, standby mode, and the like). For example, the controller 114 may include a control panel which is operated by a pilot or flight attendant (e.g., pilot control panel, flight attendant control panel, and the like). For instance, upon arriving at a gate after a flight, a pilot or flight attendant may manually input an input command via a user interface 120 of a controller 114, where the input command is configured to alter the operational state of system 100 from a standby mode 204 to a calibration mode 206. By way of another example, the one or more processors 116 may be configured to automatically adjust the operational state of system 100. For example, in the aviation context, the one or more processors 116 may be configured to automatically set the operational state of system 100 based on the state of the aircraft. For instance, upon arriving at a gate following a flight, the one or more processors 116 may be configured to determine the aircraft has been put in "park," and automatically adjust the operational state of system 100 from a standby mode 204 to a calibration mode 206. By way of yet another example, the one or more processors 116 may be configured to automatically adjust the operational state of system 100 in response to an outside action. For instance, the one or more processors 116 may be configured to automatically adjust the operational state of an aircraft in response to the opening of an exterior door.

It is noted herein that the one or more components of system 100 may be communicatively coupled to the various other components of system 100 in any manner known in the art. For example, the one or more processors 108, 116 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

In one embodiment, the one or more processors 108, 116 may include any one or more processing elements known in the art. In this sense, the one or more processors 108, 116 may include any microprocessor-type device configured to execute software algorithms and/or instructions. In one embodiment, the one or more processors 108, 116 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 108, 116. In general, the term "processor" may be broadly defined to encompass any device having one or more processing elements, which execute program instructions from memory 110, 118. Moreover, different subsystems of the system 100 (e.g., item detection device 102, display 112, controller 114, user interface 120, and the like) may include processor or logic elements suitable for carrying out at least a portion of the steps described throughout the present disclosure. Therefore, the above description should not be interpreted as a limitation on the present disclosure but merely an illustration.

The memory 110, 118 may include any storage medium known in the art suitable for storing program instructions executable by the associated one or more processors 108, 116. For example, the memory 110, 118 may include a non-transitory memory medium. For instance, the memory 110, 118 may include, but is not limited to, a read-only memory (ROM), a random access memory (RAM), a magnetic or optical memory device (e.g., disk), a magnetic tape, a solid state drive and the like. In another embodiment, the memory 110, 118 is configured to store data including, but not limited to, calibration values, check values, threshold values, and the like. It is further noted that memory 110, 118 may be housed in a common controller housing with the one or more processors 108, 116. In an alternative embodiment, the memory 110, 118 may be located remotely with respect to the physical location of the processors 108, 116, controller 114, and the like. In another embodiment, the memory 110, 118 maintains program instructions for causing the one or more processors 105, 116, 122 to carry out the various steps described through the present disclosure.

In one embodiment, the user interface 120 may include, but is not limited to, one or more desktops, tablets, smartphones, smart watches, or the like. In another embodiment, the user interface 120 includes a display 122 used to display data of the system 100 to a user. The display 122 of the user interface 120 and the display 112 of passenger cabin 101 may include any display known in the art. For example, the display 112, 122 may include, but is not limited to, a liquid crystal display (LCD), an organic light-emitting diode (OLED) based display, or a CRT display. By way of another example, display 112 may include, but is not limited to, an LED light, a blinking light, a flashing light, and the like. Those skilled in the art should recognize that any display device capable of integration with a user interface 120 is suitable for implementation in the present disclosure. In another embodiment, a user may input selections, commands, and/or instructions via user interface 120 in response to data displayed to the user via the display 112, 122.

In embodiments, the one or more processors 108 of the item detection divides 102 may be configured to cause the item detectors 104 to determine one or more calibration values of a stowage area while system 100 is in a calibration mode. It is contemplated herein that each stowage area of a passenger cabin 101 may include one or more item detection devices 102 to detect forgotten or misplaced items. Calibration values may be determined during times in which it is expected that no personal belongings may be present in the respective stowage areas. For example, while in a calibration mode 202, no passengers or personal belongings may be expected to be on the aircraft. During this time, calibration values may be determined by item detectors 104 to determine a "base line" from which to compare future check values.

Although calibration values may be collected during times in which no personal belongings are expected to be within stowage areas, this is not to say that stowage areas may not contain any items. For example, in the aircraft context, overhead compartments, credenzas, and other stowage areas may contain items even when no passengers are present on the aircraft. Items left in stowage compartments may include, but are not limited to, blankets, first aid kits, magazines, life vests, wrappers, trash, and the like. In this regard, by collecting calibration values, system 100 may be configured to decipher between items left in stowage compartments on a permanent or semi-permanent basis, and personal items left or forgotten by passengers. For example, if a blanket is present in an overhead compartment, the effects of the blanket on the item detector 104 would be taken into account within the calibration value. Subsequently, when the item detectors 104 determine a check value, a check value which is identical or similar to the calibration value may indicate the absence of forgotten personal belongings, and a check value which is substantially different from the calibration value may indicate the presence of a forgotten personal belonging.

It is contemplated herein that the one or more item detectors 104 may be configured to determine a single calibration value for a calibration mode 202. In additional and/or alternative embodiments, item detectors 104 may be configured to calculate one or more calibration readings during a calibration mode 202. For example, an item detector 104 may be configured to determine calibration readings at regular intervals over at least a portion of a calibration mode 202, such as every second, every 0.2 seconds, and the like. In embodiments where an item detector 104 is configured to determine multiple calibration readings, it is contemplated that each calibration reading may constitute a separate calibration value. Additionally and/or alternatively, multiple calibration readings may be compiled to form a single calibration value. For example, multiple calibration readings may be averaged to form a single calibration value.

In embodiments, the one or more processors 108 may be configured to cause the item detectors 104 to determine one or more check values of a stowage area while system 100 is in a check mode. Check values may also be determined during times in which it is expected that no personal belongings may be present in the respective stowage areas. For example, referring to FIG. 2, check values may be determined or collected during a check mode 206, during which time it is expected passengers are collecting their personal belongings and disembarking an aircraft.

Similarly, it is contemplated herein that the one or more item detectors 104 may be configured to determine a single check value for a check mode 206 and/or multiple check readings for a check mode 206. As noted previously, check readings may be determined at regular or irregular intervals (e.g., every second, every 0.2 seconds, and the like). Each constitute separate check values, or multiple check readings may be combined to form a single check value.

The one or more processors 108 may be further configured to receive the one or more calibration values and the one or more check values from the item detectors 104. The one or more processors 108 may be configured to retrieve calibration values and check values from the item detectors 104. Additionally and/or alternatively, the one or more processors 108 may be configured to cause the item detectors 104 to transmit the calibration values and check values to the one or more processors. It is noted that calibration values and check values may be transmitted from the item detectors 104 to the one or more processors 108 in any wireless or wireline manner known in the art.

The one or more processors 108 may be further configured to save the one or more calibration values and the one or more check values in memory 110. All values stored in memory may be time-stamped. Additionally, calibration values and check values may be organized into a database within memory 110, where the database may be filtered and/or sorted via input commands received from a user interface 120.

The one or more processors 108 may also be configured to calculate one or more difference values between the one or more calibration values and the one or more check values, and store the difference values in memory 110. A difference value may be calculated using any mathematical techniques known in the art. For example, in embodiments where an item detector 104 comprises a force sensor resistor, a difference value may be calculated by subtracting the calibration value from the check value. Similarly, difference values stored in memory 110 may be time-stamped.

In embodiments, difference values may be calculated at the same rate as check values. For example, in embodiments where check values are calculated every second, the one or more processors 108 may be configured to calculate difference values every second such that each check value is used to calculate a corresponding difference value.

The one or more processors 108 may be further configured to compare the one or more difference values to a threshold value. Threshold values may be stored in memory 110. It is contemplated herein that threshold values may be pre-set or pre-determined via user inputs to user interface 120. It is further contemplated herein that threshold values may vary based on any number of factors including, but not limited to, the type of item detector(s) 104 being used, the type of stowage area of interest, the size of the stowage area of interest, original calibration values, historical calibration/check values, and the like. It is noted herein that threshold values may be manually adjusted by a user via user interface 120, and/or may be automatically adjusted by the one or more processors 108, 116.

The one or more processors 108 may be further configured to generate one or more found item signals if the difference value is greater than the threshold value. It is noted herein that the comparison of a difference value to a threshold value may reduce the error rate and the number of "false positives" identified by system 100. For example, pressure differences, air flows, fluctuations in electrical current, and the like may all cause differences between a calibration value and a check value. However, by requiring the difference value to be greater than a threshold value, the one or more processors 118 may be configured to disregard small changes between the check value and the calibration value which may be caused by sources other than a forgotten personal belonging or other item. For instance, in embodiments where an item detector 104 includes a force sensor, requiring a difference value to be greater than a threshold value may prevent system 100 from identifying wrappers, trash, and other lightweight objects as forgotten items. In this regard, the magnitude of the threshold value may be adjusted based on competing goals of effectively identifying items of various shapes and sizes, and avoiding false positives (e.g., identifications of a forgotten personal belonging when there is none).

The found item signals generated by the one or more processors 108 may be configured to cause the display 112 and/or display 122 to display the presence of a forgotten item. The display 112 and/or display 122 may be configured to indicate the presence of a forgotten item in any manner known in the art including, but not limited to, a typed/written message, LED lights, blinking lights, visual cues, audio cues, haptic feedback, and the like. It is contemplated herein that the display 112 may be positioned so as to catch the attention of a passenger. For example, referring to an aviation context, a display 112 positioned on the back of aircraft seats may be configured to display the presence of a forgotten item in response to the one or more forgotten item signals generated by the one or more processors 108. By way of another example, display 112 may include an LED light positioned on the back of aircraft seats which, when illuminated, indicates the presence of a forgotten item in response to the one or more forgotten item signals generated by the one or more processors. In an additional and/or alternative embodiment, display 112 and/or display 122 may be configured to indicate the presence of a forgotten item to the pilot or aircraft personnel such that aircraft personnel may remind a passenger of the forgotten item prior to disembarking the aircraft. By informing a passenger as to the presence of a forgotten item before disembarking an aircraft, system 100 may effectively reduce the number of items and personal belongings which are left on aircraft, and improve the travel experience of passengers.

In embodiments where multiple check values and multiple difference values are determined in a single check mode 206, the one or more processors 108 may be further configured to transmit one or more signals to the display 112, 122 which are configured to cause the display to stop reporting a forgotten item. For example, a first difference value calculated at a first time may indicate the presence of a forgotten item, and the one or more processors 108 may be configured to generate one or more found item signals configured to cause the display 112, 122 to report a forgotten item. Subsequently, a second difference value calculated at a second time may indicate the absence of a forgotten item (e.g., a passenger retrieved an item between the first time and the second time). Accordingly, the one or more processors 108 may be configured to generate one or more signals configured to cause the display 112, 122 to stop reporting a missing item. In this regard, determining multiple check values and/or difference values at regular or semi-regular intervals may allow the display 112, 122 to report the presence or absence of forgotten items in real or near-real time.

Figure 3A:
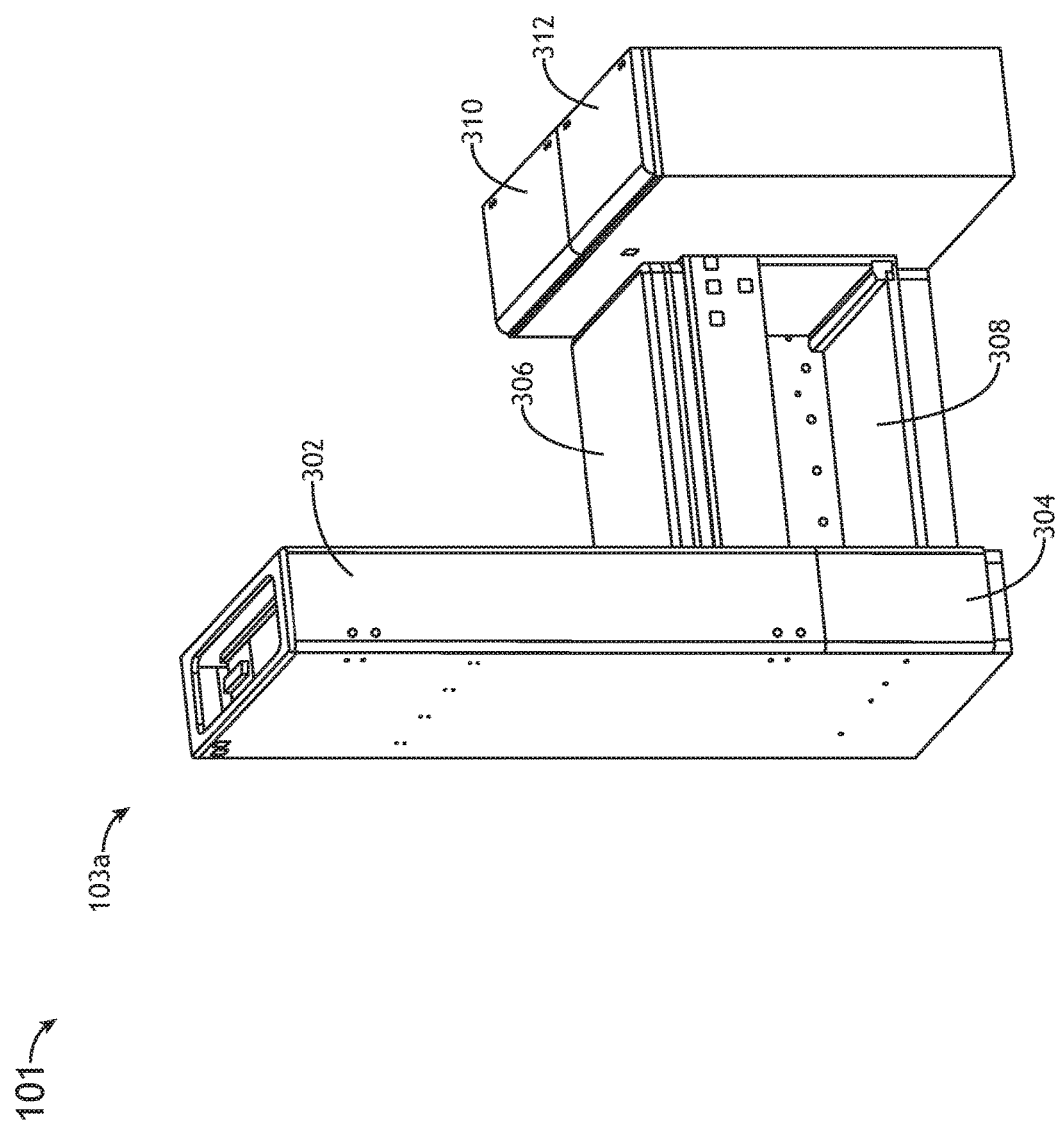
FIG. 3A illustrates a front perspective view of a portion of a passenger compartment including multiple stowage areas, in accordance with one or more embodiments of the present disclosure.

FIG. 3A illustrates a front perspective view of a passenger compartment 103a including multiple stowage areas, in accordance with one or more embodiments of the present disclosure. Specifically, FIG. 3A illustrates a portion of a passenger compartment 103a. It is contemplated herein that a passenger cabin 101 (e.g., aircraft cabin, train cabin, etc.) may include one or more passenger compartments 103a-103n, as illustrated in FIG. 3A.

Passenger compartment 103a, as illustrated in FIG. 3A, may represent a "Super First Class" suite of an aircraft. Passenger compartment 103a may include multiple stowage areas including, but not limited to, a wardrobe 312, a drawer 304, a vanity 306 (e.g., under-seat stowage area), an ottoman stowage area 308, a deep credenza pocket 310, and a shallow credenza pocket 312. It is noted herein that the various stowage areas illustrated in FIG. 3A are provided solely for illustrative purposes. Generally, the stowage areas illustrated in FIG. 3A illustrate various stowage areas within which passengers may forget or otherwise leave personal belongings and other items. In this regard, it is contemplated that system 100 may be implemented within other stowage areas. For example, as noted previously herein, system 100 may be configured to identify lost or forgotten items and personal belongings within overhead compartments and other stowage areas of economy class seats of a passenger cabin 101.

Figure 3B:
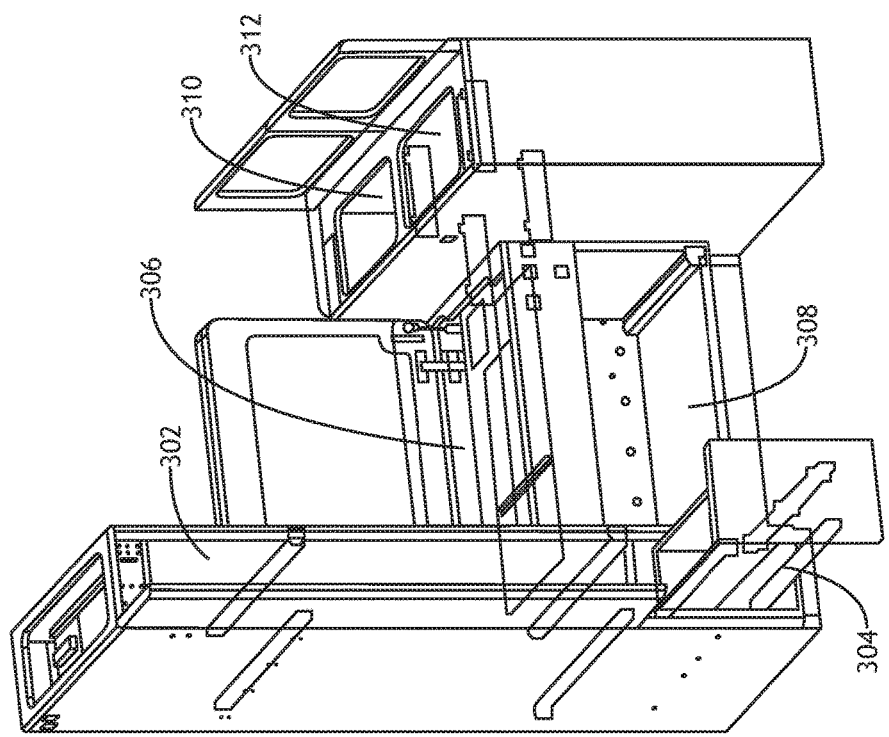
FIG. 3B illustrates a front perspective view of a portion of a passenger compartment including multiple stowage areas, in accordance with one or more embodiments of the present disclosure.

FIG. 3B illustrates a front perspective view of a passenger compartment 103a including multiple stowage areas, in accordance with one or more embodiments of the present disclosure. Specifically, FIG. 3B illustrates the various stowage areas a wardrobe 312, a drawer 304, a vanity 306, an ottoman stowage area 308, a deep credenza pocket 310, and a shallow credenza pocket 312, and the like) in an "open" or "accessible" configuration.

Figure 3C:
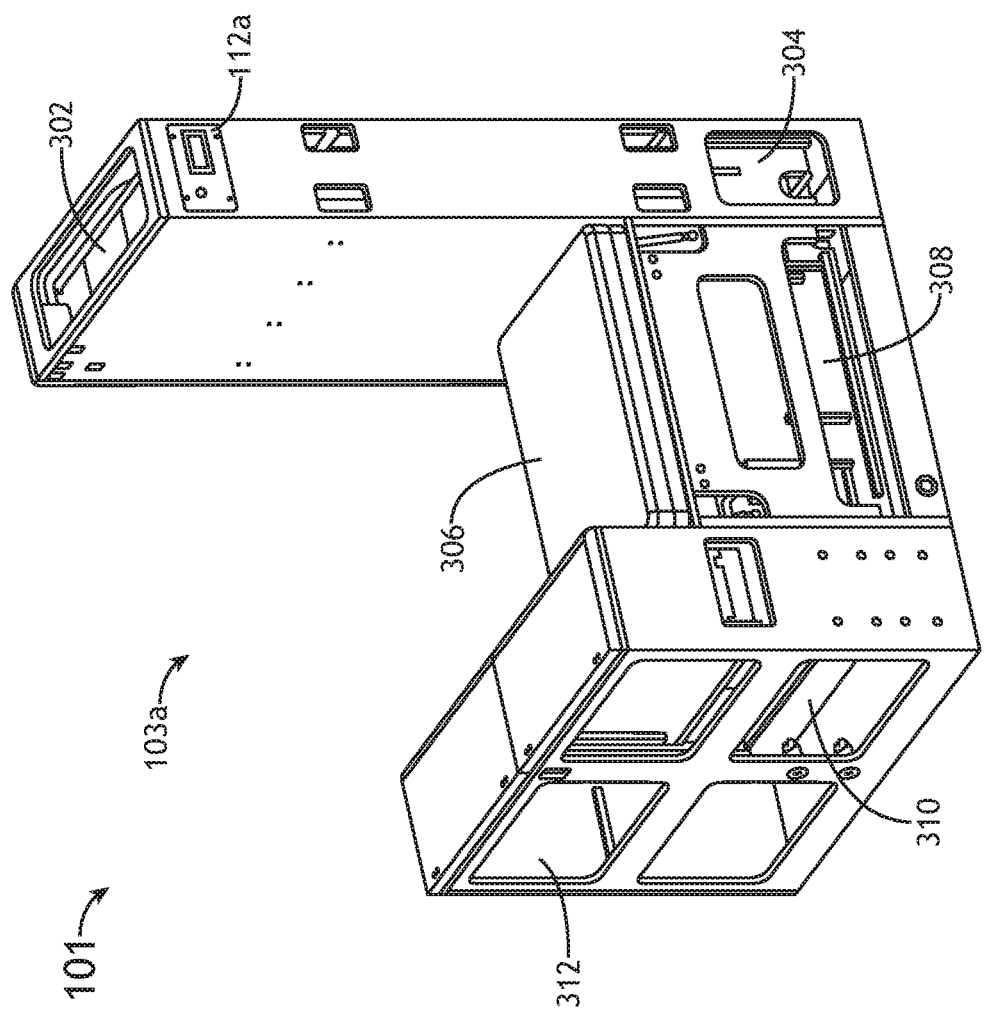
FIG. 3C illustrates a rear perspective view of a portion of a passenger compartment including multiple stowage areas, in accordance with one or more embodiments of the present disclosure.

It is contemplated herein that different stowage areas may be equipped with different types of item detectors 104. For example, as shown in FIGS. 3A-3C, an ottoman stowage area 308 may be constantly exposed to ambient light, whereas a wardrobe 302, drawer 304, or vanity 306 may be exposed to ambient light only in an "open" or "accessible" configuration. In this regard, some item detectors 104 may be more suitable for particular stowage areas than others. For instance, item detectors 104 which require ambient light, such as cameras without flash capabilities, may be ill-suited for use within the wardrobe 302, drawer 304, or vanity 306 due to the fact that these stowage areas typically are not exposed to ambient light. Other considerations which may affect the selection of item detectors 104 within stowage areas may include, but are not limited to, susceptibility of the item detector 104 to air currents, aesthetic appearance of the item detector 104, size of the item detector 104, desired sensitivity of the item detector 104, type/size of items typically stored in each stowage area, and the like.

FIG. 3C illustrates a rear perspective view of a passenger compartment 103a including multiple stowage areas, in accordance with one or more embodiments of the present disclosure.

As may be seen in FIG. 3C, passenger compartment 103a may include one or more displays 112 configured to report the presence of a forgotten item. It is noted herein that the one or more displays 112 may be configured to report the presence of a forgotten item within any stowage area of system 100. For example, as shown in FIG. 3C, display 112 may be positioned on a back surface of the portion of passenger compartment 103a. In this regard, display 112 may be configured to report the presence of a forgotten item found within a stowage area of a seat (e.g., portion of passenger compartment 103b) which is positioned immediately behind passenger compartment 103a. For example, the display 112 may include an in-flight entertainment system display.

In embodiments, display 112, 122 may be configured to report the presence of a forgotten item in any manner known in the art including, but not limited to, written/typed messages, blinking lights, visual cues, audio cues, haptic feedback, and the like. Furthermore, it is contemplated herein that the display 122, 122 may be configured to alert a passenger and/or flight personnel as to the specific location or stowage area of a forgotten item. For example, display 112 may be configured to report an identified item within a wardrobe 302 of a passengers 302 seat. By way of another example, display 122 may be configured to report an identified item along with the location of the item including, but not limited to, an aisle number, a seat number, a particular stowage area, and the like. In embodiments, display 112, 122 may be configured to report an absence of forgotten items until one or more forgotten item signals are received.

Although example embodiments of the present disclosure are shown and described in an aircraft environment, the inventive concepts of the present disclosure may be configured to operate in any type of seat and/or vehicle known in the art. For example, the embodiments of the present disclosure may be incorporated into the seats of any air, land, or water-based personal equipment or vehicle; any air, land, or water-based commercial equipment or vehicle; any air, land, or water-based military equipment or vehicle known in the art. By way of another example, embodiments of the present disclosure may be incorporated into the seat of an automobile. In the interest of simplicity and to most clearly define the inventive concepts of the present disclosure, embodiments may be described throughout the present disclosure in an aircraft environment. However, these references are not to be regarded as limiting. Thus, references to "aircraft," "airplanes," "avionics," and like terms should not be interpreted as a limitation on the present disclosure, unless noted otherwise herein.

It is further noted herein that, where the environment includes an avionics environment, it is noted herein the system and method for forgotten item identification may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is further noted herein that any steps or functions of the present disclosure which are described as being carried out by the one or more processors 108 of the item detection device 102 may additionally and/or alternatively be carried out by the one or more processors 116 of the controller 114, and vise versa. For example, the one or more processors 116 may be configured to carry out functions described as being carried out by the one or more processors 108 including, but not limited to: causing the item detectors 104 to determine calibration values and/or check values, receiving calibration values and check values, storing calibration values and check values in memory 118, calculating difference values, comparing difference values to threshold values, generating one or more found item signals, and the like.

Figure 4:
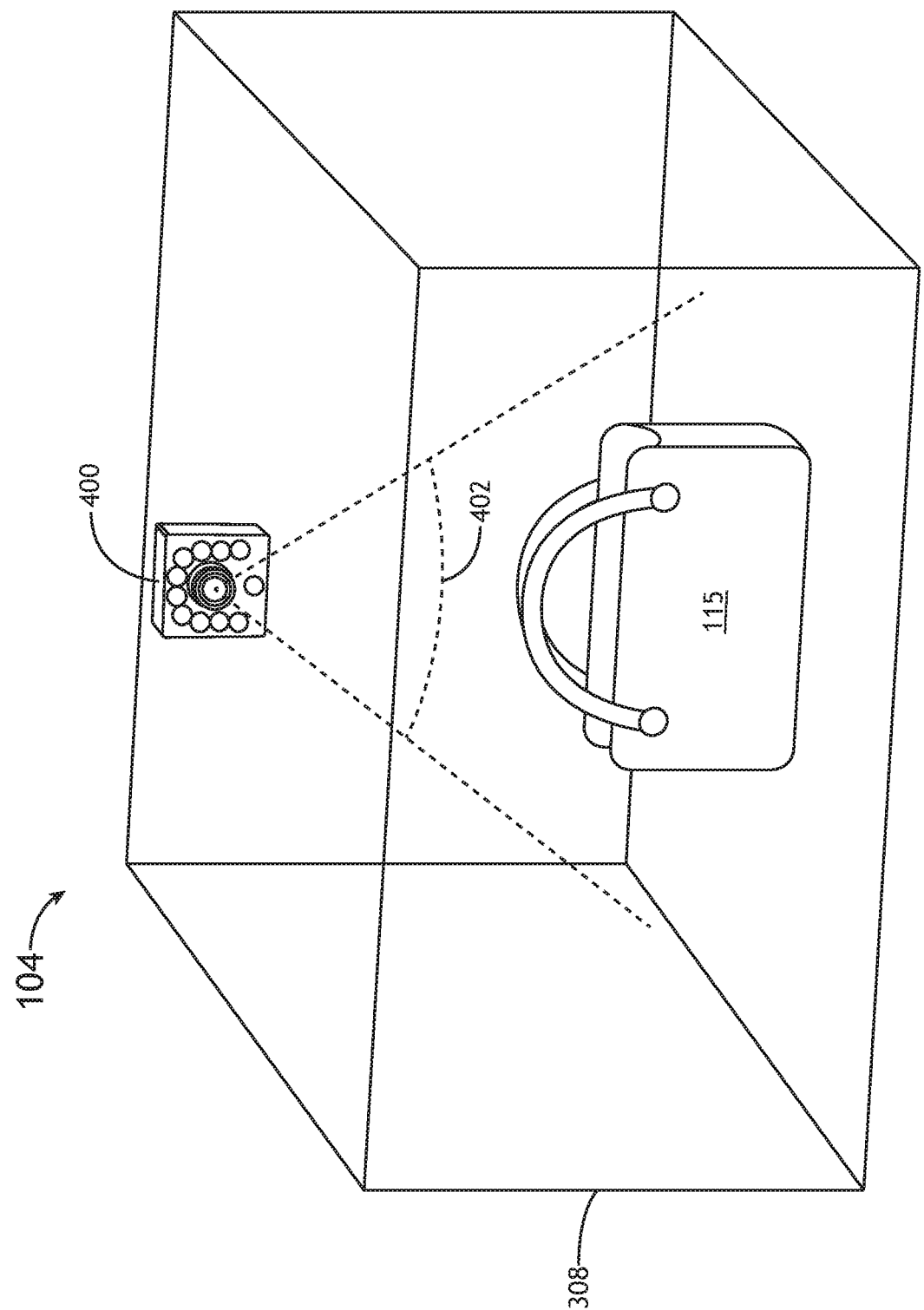
FIG. 4 illustrates a stowage area equipped with an item detector, in accordance with one or more embodiments of the present disclosure.

FIG. 4 illustrates a stowage area equipped with an item detector 104, in accordance with one or more embodiments of the present disclosure. Specifically, FIG. 4 illustrates an ottoman stowage area 308 equipped with an item detector 104 comprising a camera 400.

In embodiments, camera 400 may be configured to identify items left or forgotten within ottoman stowage area 308. For example, the camera 400 may be configured to collect images of forgotten items 115 within a field of view 402. Camera 400 may be positioned within stowage area such that the field of view 402 is increased and/or maximized. Camera 400 may be configured to acquire images in any range of the electromagnetic spectrum including, but not limited to, visible light, ultraviolet (UV) light, infrared (IR) light, and the like. In embodiments, camera 400 may include means for generating a flash or other light source such that the camera 400 may be used within stowage areas with low ambient light levels. Additionally and/or alternatively, camera 400 may be communicatively coupled to additional components which are configured to generate light during times in which camera 400 is acquiring images.

It is contemplated herein that the form of calibration values, check values, difference values, and threshold values may vary depending on the type of item detector 104 being used. For example, in embodiments where item detector 104 comprises a camera 400, a calibration value may include an image collected by the camera 400 during a calibration mode 202, and a check value may include an image collected by the camera 400 during a check mode 206. Furthermore, where an item detector 300 includes a camera 400, a difference value and/or a threshold may include any metric which is indicative of a level of similarity or difference between the first image and the second image. Accordingly, a difference value between a first image (e.g., calibration value or calibration image) and a second image (e.g., check value or check image) may be calculated using any image analysis techniques, algorithms, or mathematical procedures known in the art.

For example, during a calibration mode 202, camera 400 may acquire a first image (e.g., calibration value or calibration image) of the ottoman stowage area 308. The camera 400 may subsequently acquire a second image (e.g., check value or check image) of the ottoman stowage area 308 during a check mode 206. One or more processors 108 may then compare the first image and the second image (e.g., calibration value and check value) and determine a difference value. In this example, an item depicted in the second image (e.g., check value) which was not depicted in the first image (e.g., calibration value) may result in a high difference value which is greater than a threshold value. The high difference value may be a metric which is indicative of a high level of difference (or low level of similarity) between the first image and the second image. Accordingly, the one or more processors 108 may be configured to generate one or more found item signals upon determining the difference value is greater than the threshold value.

Figure 5:
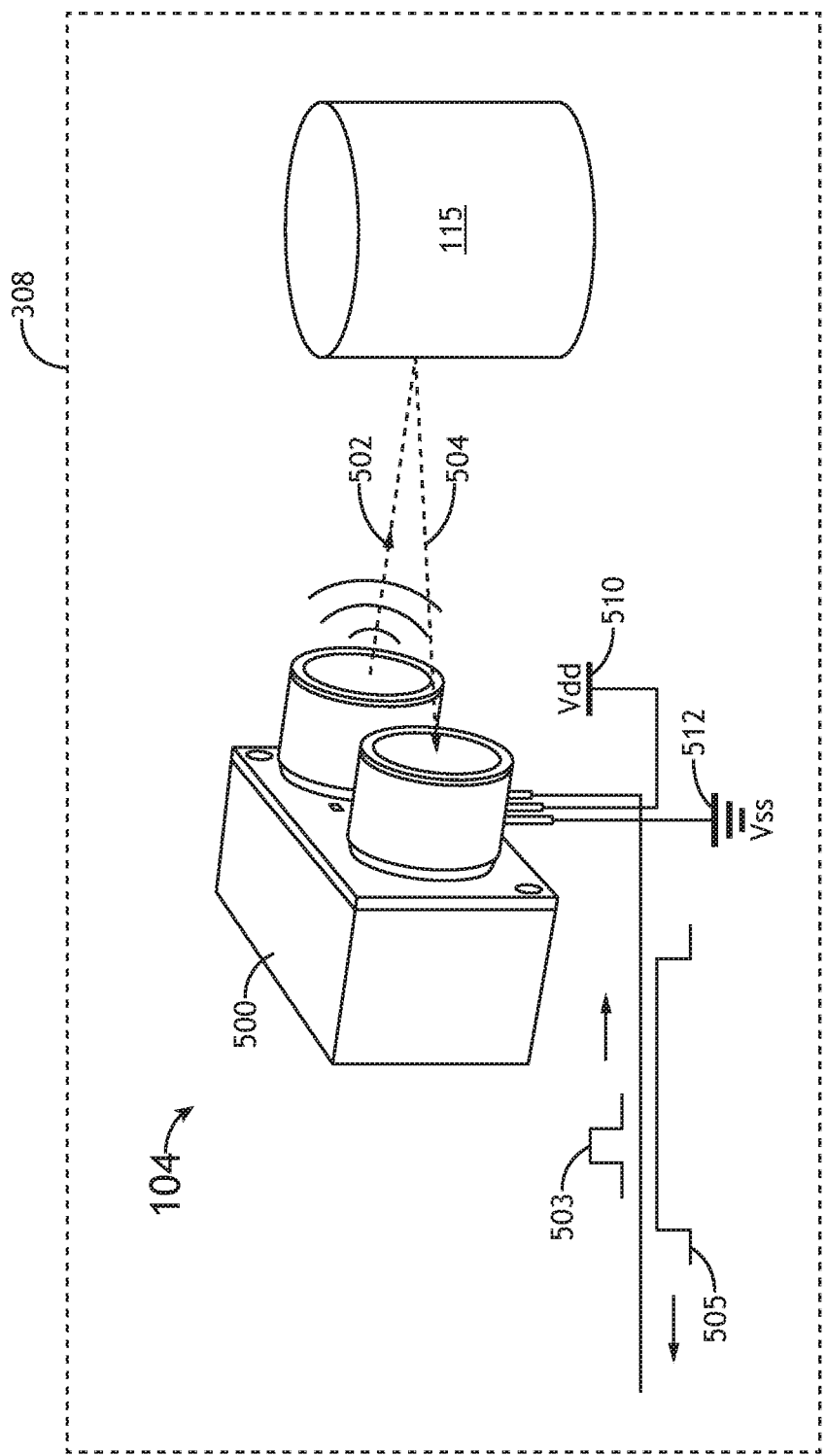
FIG. 5 illustrates a stowage area equipped with an item detector including an ultrasonic sensor, in accordance with one or more embodiments of the present disclosure.

FIG. 5 illustrates a stowage area equipped with an item detector 104 including an ultrasonic sensor 500, in accordance with one or more embodiments of the present disclosure.

Ultrasonic sensor 500 may include any ultrasonic sensor or ultrasonic transducer known in the art. In embodiments, ultrasonic sensor 500 may be configured to emit a pulse or "chirp" 502 which exhibits a pulse pattern 503. The pulse 502 may be configured to encounter an item 115 and return to the ultrasonic sensor 500 as an "echo" 504 with induces a signal with an echo pattern 505. Calibration values and check values in the context of ultrasonic sensors 500 may include current values or voltage values of signals induced by the echo 504. In this regard, difference values in the context of ultrasonic sensors 500 may include differences in the ultrasonic sensor 500 signals (e.g., signal current value, signal voltage value) induced by echoes 504 identified during a calibration mode 202 and a check mode 206. It is noted herein that calibration values, check values, difference values, and threshold values may be based on any characteristic of the echo pattern 505 or signal induced by the echo 504 including, but not limited to, delay between pulse 502 and echo 504, current of induced signal, voltage of induced signal, amplitude of induced signal, and the like.

It is noted herein that ultrasonic sensors 500 may be desirable within stowage areas which are readily visible in that ultrasonic sensors 500 may be concealed. For example, an ultrasonic sensor 500 may be disposed behind a wall or surface of a stowage area. Furthermore, ultrasonic sensors 500 do not require ambient light, and may therefore be desirable in stowage areas with low levels of ambient light. It is further noted, however, that ultrasonic sensors 500 may exhibit low sensitivity levels in that they may be unable to identify items 115 which are very small.

Figure 6:
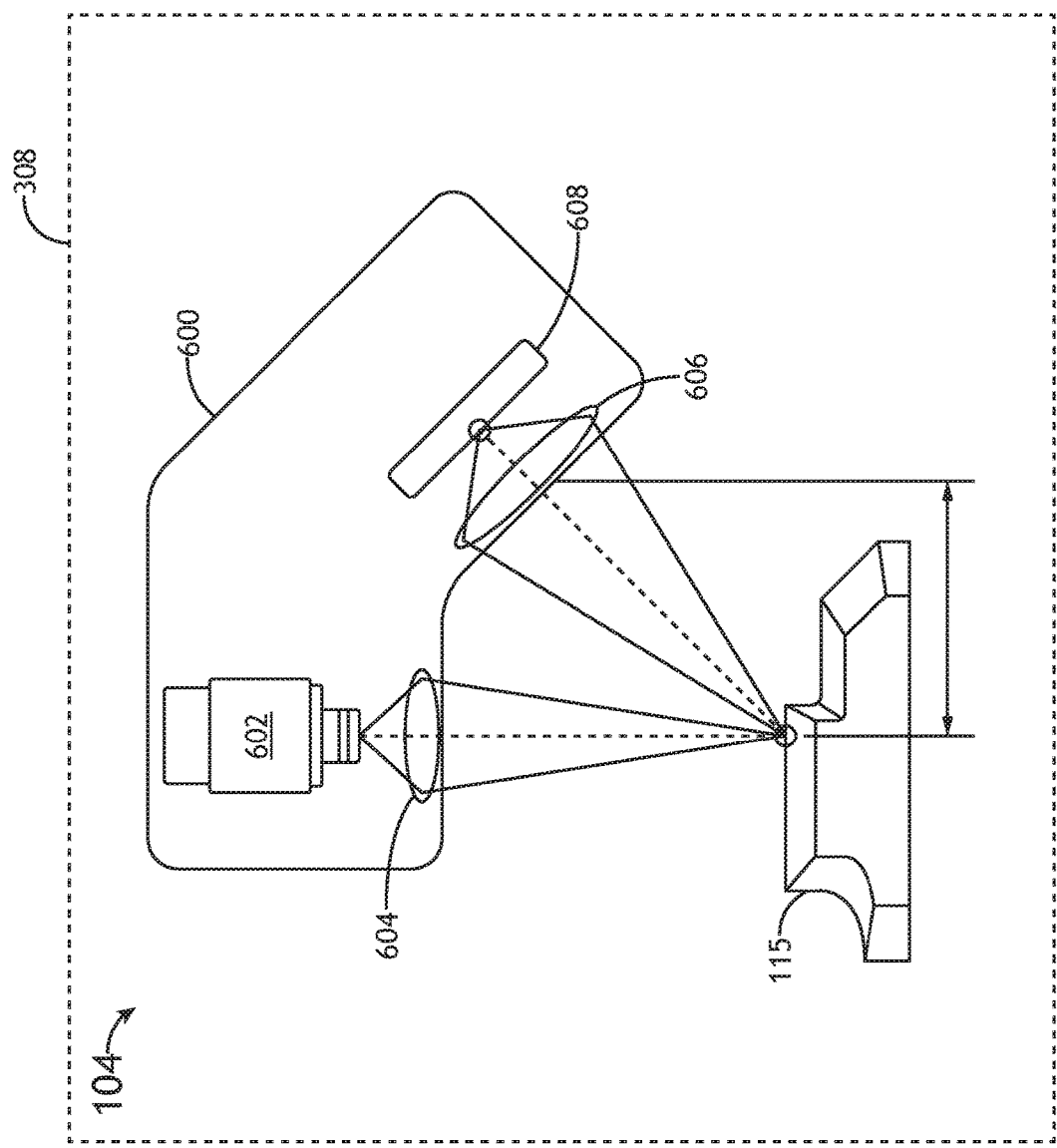
FIG. 6 illustrates a stowage area equipped with an item detector including a scanning laser, in accordance with one or more embodiments of the present disclosure.

FIG. 6 illustrates a stowage area equipped with an item detector 104 including a scanning laser 600, in accordance with one or more embodiments of the present disclosure.

In embodiments, a stowage area may include multiple item detectors 104 including one or more scanning lasers 600. A scanning laser 600 may include, but is not limited to, one or more laser sources 602, projection optics 604, collection optics 606, and a detector 608. The laser source 602 may include any laser source known in the art for generating an illumination beam. The projection optics 604 may include any optical elements configured to direct an illumination beam from the laser to one or more items 115 within a stowage area (e.g., ottoman stowage area 308). Similarly, collection optics 606 may include any optical elements configured to collect illumination deflected, diffracted, reflected, or otherwise scattered from the item 115 and direct the illumination to one or more detectors 608.

For example, a scanning laser 600 may be configured to determine a calibration value of the ottoman stowage area 308 while in a calibration mode 202, and determine a check value of the ottoman stowage area 308 while in a check mode 206. In this example, the calibration value may include data associated with a point cloud collected in the calibration mode 202, wherein the check value may include data associated with a point cloud collected in the check mode 206. However, this is not to be regarded as limiting. In this regard, the calibration value, check value, difference value, and threshold value in the context of a scanning laser 600 may include, but are not limited to, point cloud data, signals collected by the one or more detectors 608, and the like.

Scanning lasers 600 may be desirable in that they may be able to detect and identify very small items 115. However, determining calibration values, check values, difference values, and threshold values in the context of a scanning laser 600 may be computationally intensive.

Figure 7A:
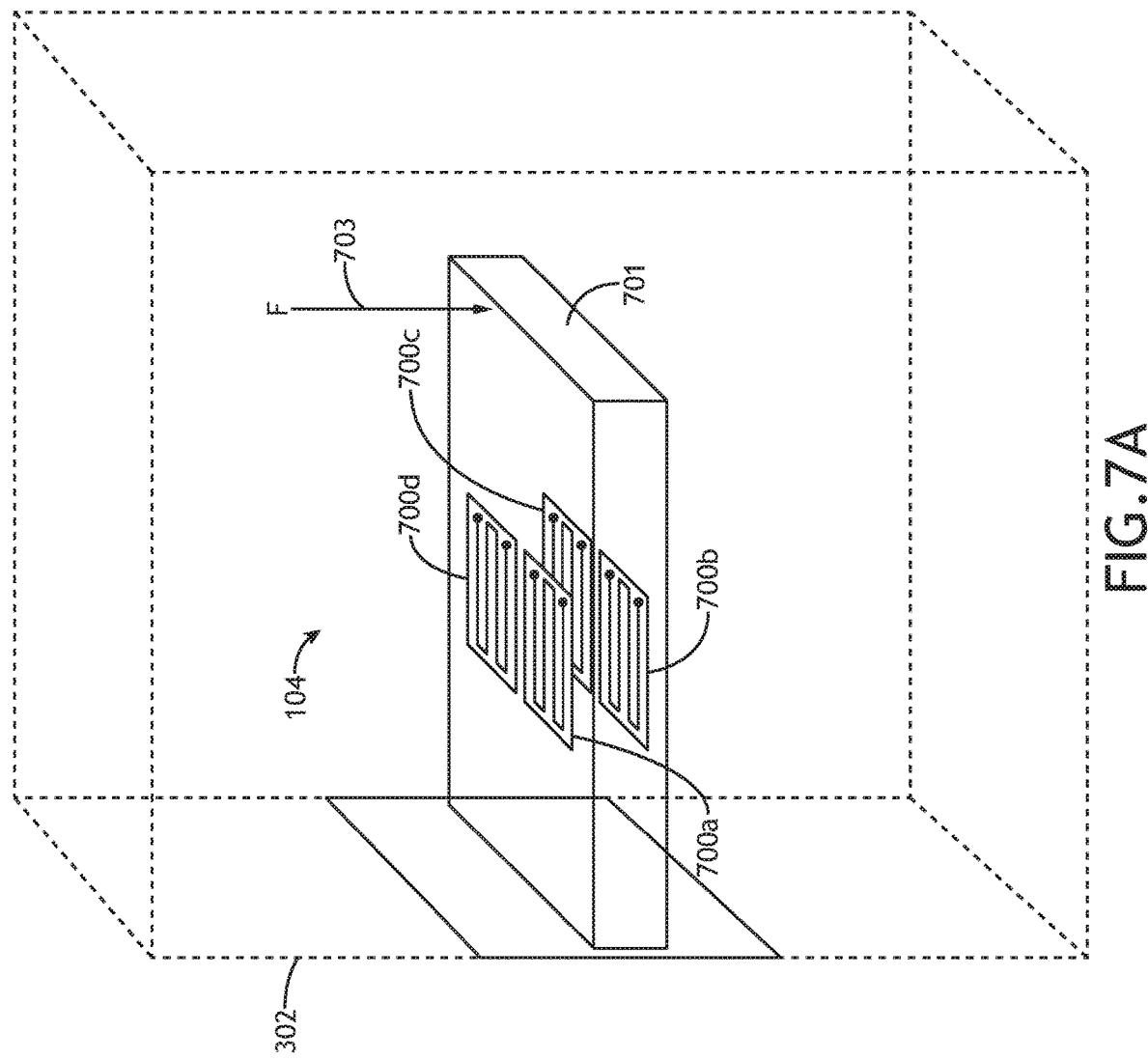
FIG. 7A illustrates a stowage area equipped with an item detector including one or more strain gauges, in accordance with one or more embodiments of the present disclosure.

FIG. 7A illustrates a stowage area equipped with an item detector 104 including one or more strain gauges 700a-700d, in accordance with one or more embodiments of the present disclosure.

It is contemplated herein that item detectors 104 may include one or more strain gauges 700 in stowage areas where a forgotten item will exert a force which will strain a surface. For example, as shown in FIG. 7A, one or more strain gauges 700a, 700b, 700c, 700d may be disposed on a shelf 701 within a wardrobe 302 stowage area. In this example, the one or more strain gauges 700 may be configured to determine a force 703 exerted upon the shelf 701. Objects placed on the shelf 701 may induce strain on the shelf 701, which would thereby indicate the presence of the objects. In this regard, when no items 115 or other objects are placed on the shelf 701, the strain gauges 700 may identify no force or a small force resulting from the weight of the shelf 701. Conversely, when items 115 or other objects are placed on the shelf 701, the strain gauges 700 may identify larger forces resulting from the weight of the items 115. In the context of strain gauges 700, calibration values, check values, difference values, and threshold values may comprise strain values, measured forces, induced voltages, induced currents, and the like, measured by the one or more strain gauges 700.

Figure 7C:
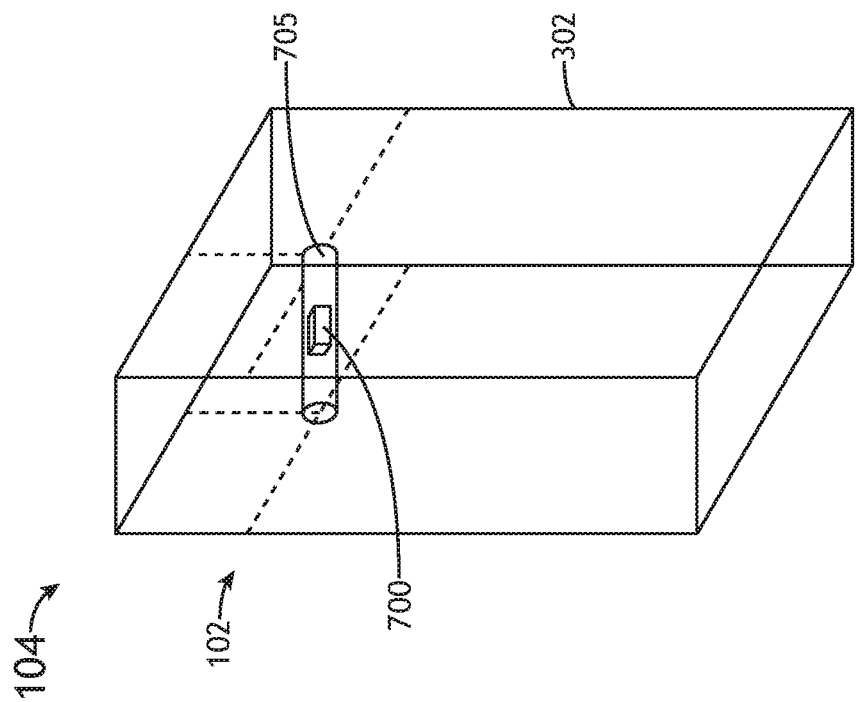
FIG. 7C illustrates a stowage area equipped with an item detector including a strain gauge, in accordance with one or more embodiments of the present disclosure.
Figure 7B:
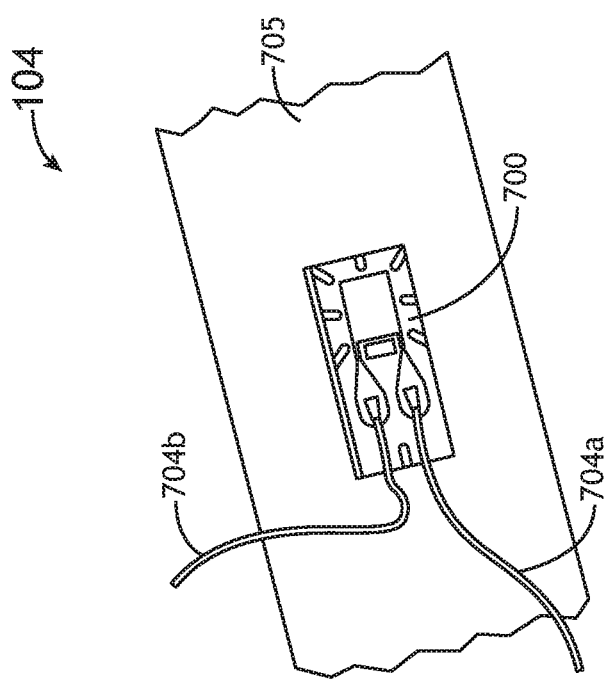
FIG. 7B illustrates a coat hanger equipped with an item detector including a strain gauge, in accordance with one or more embodiments of the present disclosure.

FIG. 7B illustrates a coat hanger 705 equipped with an item detector 104 including a strain gauge 700, in accordance with one or more embodiments of the present disclosure. The strain gauge 700 may include any strain gauge known in the art configured to measure force or strain. In this regard, strain gauge 700 may include, but is not limited to, a body 702 and one or more leads 704a, 704b. The body 702 may be configured to convert force, pressure, or strain into an electrical signal. In this regard, the one or more leads 704a, 704b may be configured to communicatively couple the strain gauge 700 to the one or more processors 108 and transmit electrical signals generated by the strain gauge 700 to the one or more processors 108.

FIG. 7C illustrates a stowage area equipped with an item detector 104 including a strain gauge 700, in accordance with one or more embodiments of the present disclosure.

It is contemplated herein that one or more strain gauges 700 may be used to identify forgotten items which may exert a vector force on a surface. For example, strain gauges 700 may be used to identify items on shelves 701, coat hooks, coat hangers 705, and the like. For instance, as shown in FIG. 7C, one or more strain gauges 700 may be disposed on a coat hanger 705 within a wardrobe 302 stowage area. Items forgotten or otherwise left on the coat hanger 705 (e.g., coats, jackets, suits, hanging bags, and the like) may exert a strain on the coat hanger 705, which may be identified by the one or more strain gauges 700.

Figure 8B:
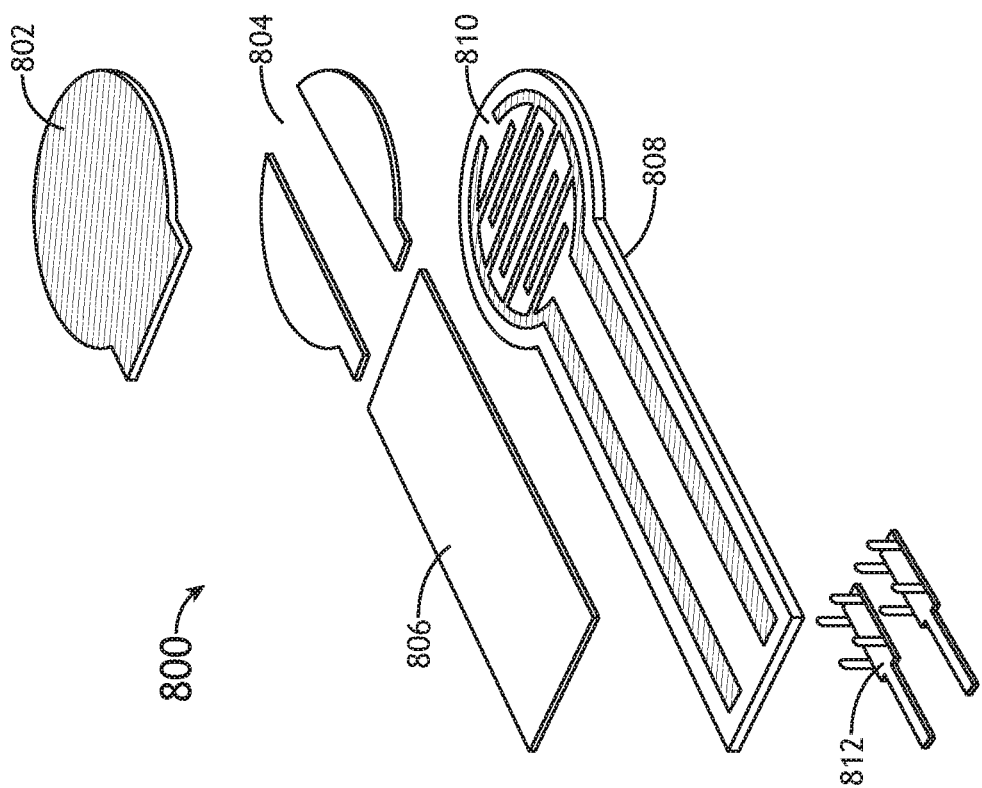
FIG. 8B illustrates an exploded view of a force sensor, in accordance with one or more embodiments of the present disclosure.
Figure 8A:
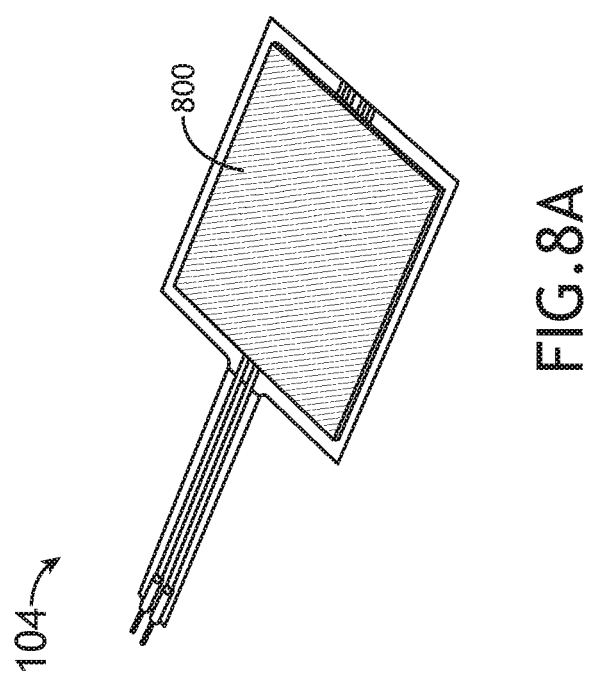
FIG. 8A illustrates an item detector including a force sensor, in accordance with one or more embodiments of the present disclosure.

FIG. 8A illustrates an item detector 104 including a force sensor 800, in accordance with one or more embodiments of the present disclosure.

In embodiments, one or more force sensors 800 may be disposed on and/or beneath a bottom surface of a stowage area such that it is configured to identify forgotten items 115.

Force sensors 800 may include any force sensors known in the art which convert forces into electrical signals including, but not limited to, resistive force sensors, capacitive force sensors, pressure sensors, and the like. In this regard, difference values in the context of force sensors 800 may include any metric indicative of an electrical output generated by the force sensor 800 including, but not limited to, resistance readings, capacitance readings, induced voltages, and the like.

For example, a force sensor 800 may be configured to determine a calibration value during a calibration mode 202. The calibration value may include the voltage of the output of the force sensor 800 when the calibration value is collected. Similarly, the force sensor 800 may be configured to determine a check value during a check mode 206, where the check value includes the voltage of the output of the force sensor 800 when the check value is collected. The one or more processors 108 may then be configured to calculate a difference value (e.g., voltage difference between the calibration value and the check value) and compare the difference value to a threshold value. In this example, the threshold value may include a voltage of an output of the force sensor 800 which may correspond to a particular force exerted on the force sensor 800. If the difference value (e.g., voltage difference between the calibration value and the check value) is greater than the threshold value (e.g., threshold voltage value), the one or more processors 108 may be configured to generate one or more found item signals.

FIG. 8B illustrates an exploded view of a force sensor 800, in accordance with one or more embodiments of the present disclosure. Force sensor 800 may include, but is not limited to, a resistive polymer 802, spacers 804, a protective cover 806, a thin film 808 with conductive traces 810, and one or more leads 812 electrically coupled to the conductive traces 810.

Figure 8D:
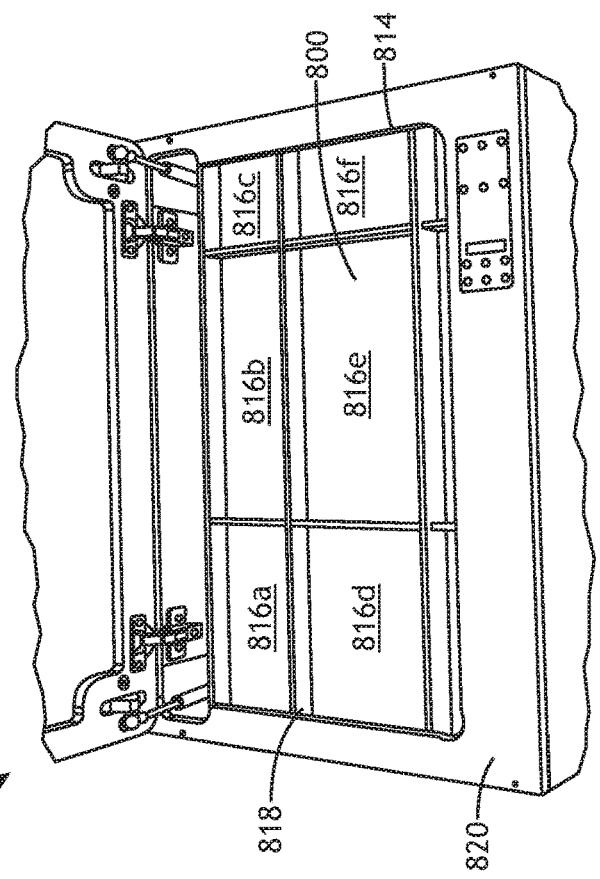
FIG. 8D illustrates a stowage area equipped with an item detector including a sensor resistor, in accordance with one or more embodiments of the present disclosure.
Figure 8C:
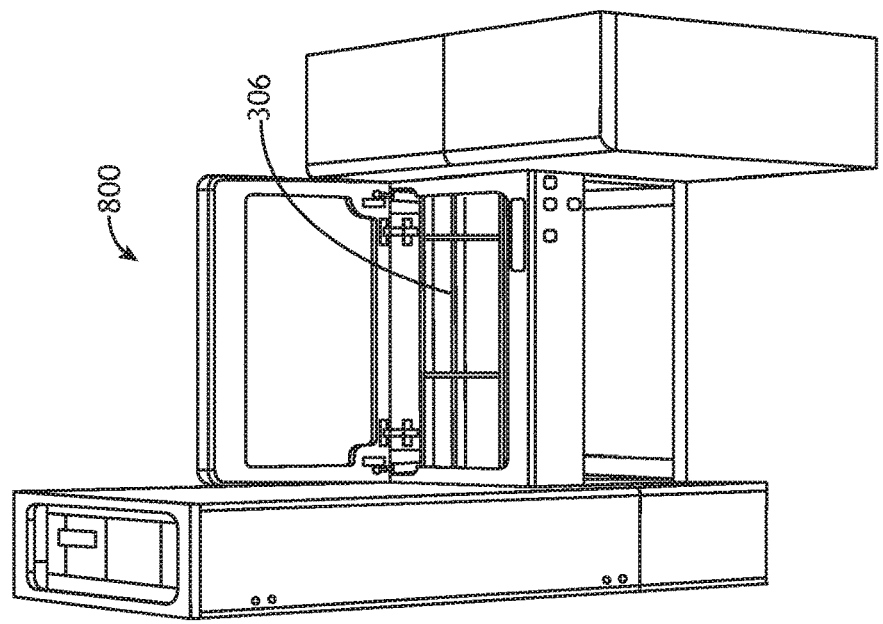
FIG. 8C illustrates a stowage area equipped with an item detector including a sensor resistor, in accordance with one or more embodiments of the present disclosure.

As may be seen in FIG. 8A-8C, a force sensor 800 may constitute a thin pad or sheet. It is contemplated herein that a thin sheet force sensor 800 may be disposed on and/or beneath a bottom surface of a stowage area in order to identify items within the stowage area. This may be better understood with reference to FIGS. 8C-8D.

Figure 8E:
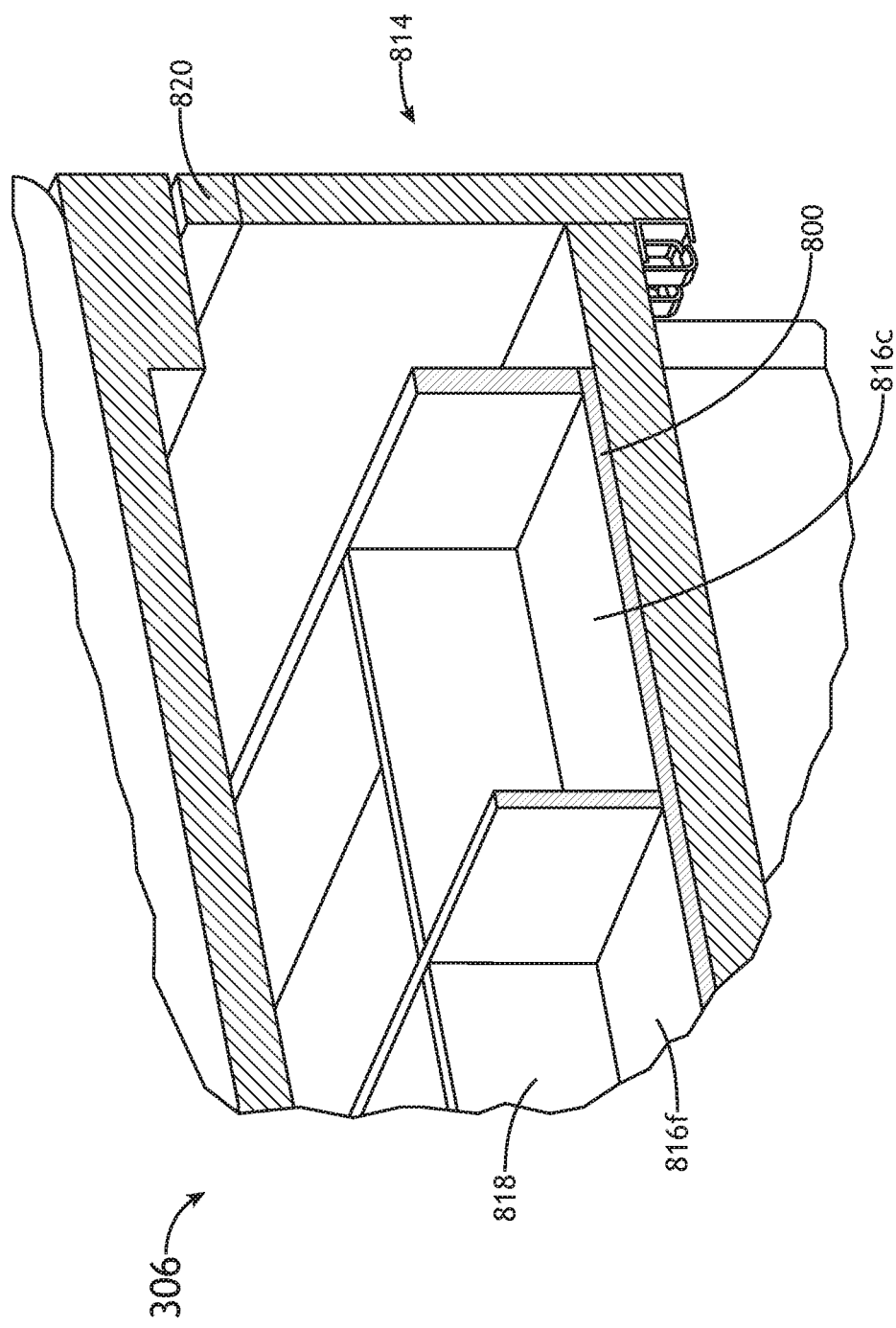
FIG. 8E illustrates a stowage area equipped with an item detector including a sensor resistor, in accordance with one or more embodiments of the present disclosure.

FIGS. 8C-8E illustrate a stowage area equipped with one or more force sensors 800, in accordance with one or more embodiments of the present disclosure. Specifically, FIGS. 8C-8D illustrates a vanity 306 (e.g., under-seat stowage area) of a passenger compartment 103a equipped with one or more force sensors 800.

As shown in FIG. 8D, the vanity 306 (e.g., under-seat stowage area) may comprise a vanity tray 814 including one or more vanity stowage compartments 816a-816f. The one or more vanity stowage compartments 816a-816f may be separated by one or more vanity tray walls 818, and a bezel 820 may be disposed on top of the vanity tray walls 820. In embodiments, one or more force sensors 800 may be disposed under a bottom surface of the vanity tray 814 and configured to identify items within the vanity 306 stowage compartment. For example, the bottom surface of the vanity 306 may include a plastic sheet. One or more force sensors 800 may be disposed under the plastic sheet in order to identify items within the vanity 306.

By way of another example, the bottom surface of the vanity 306 may include one or more plastic sheets. For instance, each vanity stowage compartment 816 may include a separate plastic sheet, which together make up the bottom surface of the vanity tray 814. In this example, each vanity stowage compartment 816 may include one or more force sensors 800 which are configured to identify items within each respective vanity stowage compartment 816. For instance, if each vanity stowage compartment 816a-816f included a force sensor 800a-800f, each force sensor 800a-800f may be configured to determine a calibration value of each respective vanity stowage compartment 816a-816f, determine a check value of each respective vanity stowage compartment 816a-816f, and the like.

Figure 9A:
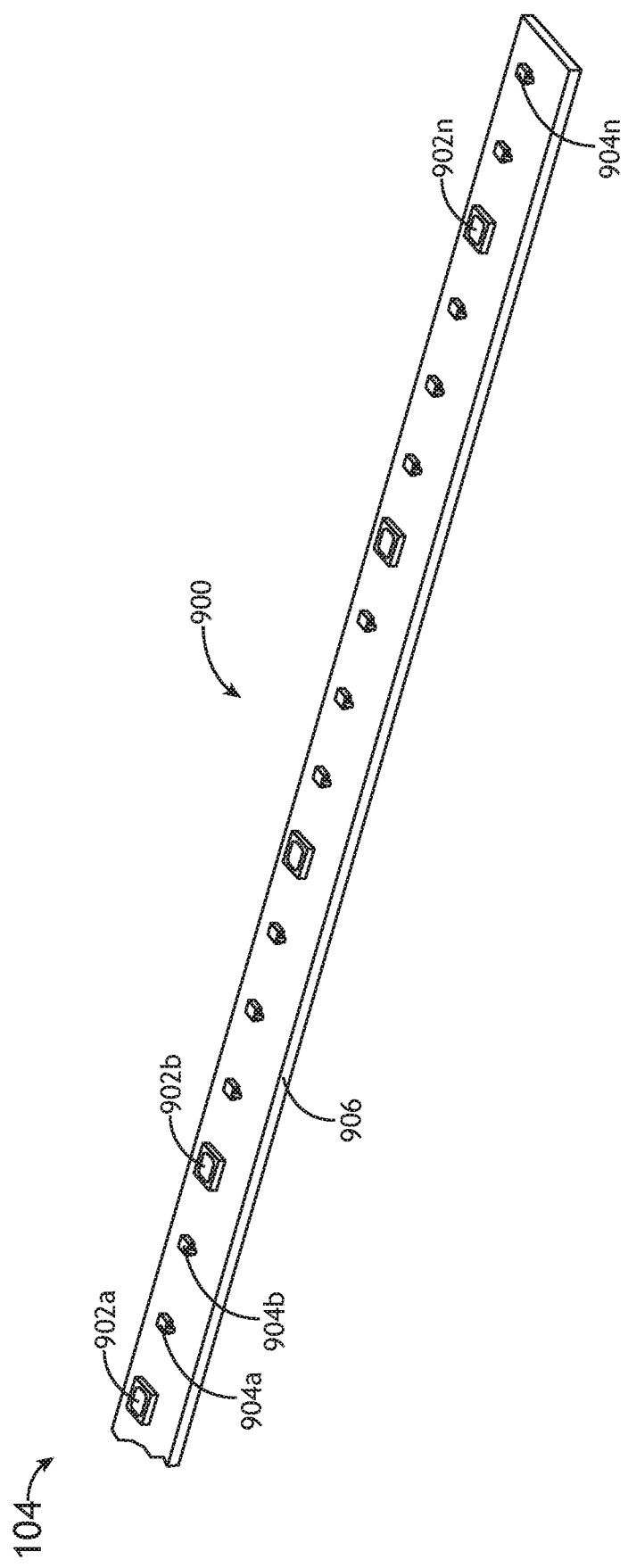
FIG. 9A illustrates an item detector including a light detector, in accordance with one or more embodiments of the present disclosure.

FIG. 9A illustrates an item detector 104 including a light detector 900, in accordance with one or more embodiments of the present disclosure. It is contemplated herein that an array of light sources may be configured to direct light to an array of light sensors. Items positioned between the array of light sources and the array of light sensors may decrease the light detected by the array of light sensors, and thereby indicate the presence of the item. In this regard, a light detector 900 may include, but is not limited to, one or more light sources 902a-902n and one or more sensors 904a-904n disposed on a base structure 906.

The one or more light sources 902 may include any light source known in the art including, but not limited to, one or more light emitting diodes (LEDs). The one or more light sources 902 may be configured to generate light of any wavelength including, but not limited to, visible light, IR light, UV light, and the like. Similarly, the one or more light sensors 904 may include any sensors known in the art for detecting light including, but not limited to, one or more phototransistors, one or more photovoltaics, one or more photodiodes, one or more photoresistors, and the like. In embodiments, the base structure 906 may include, but is not limited to, a printed circuit board.

Figure 9B:
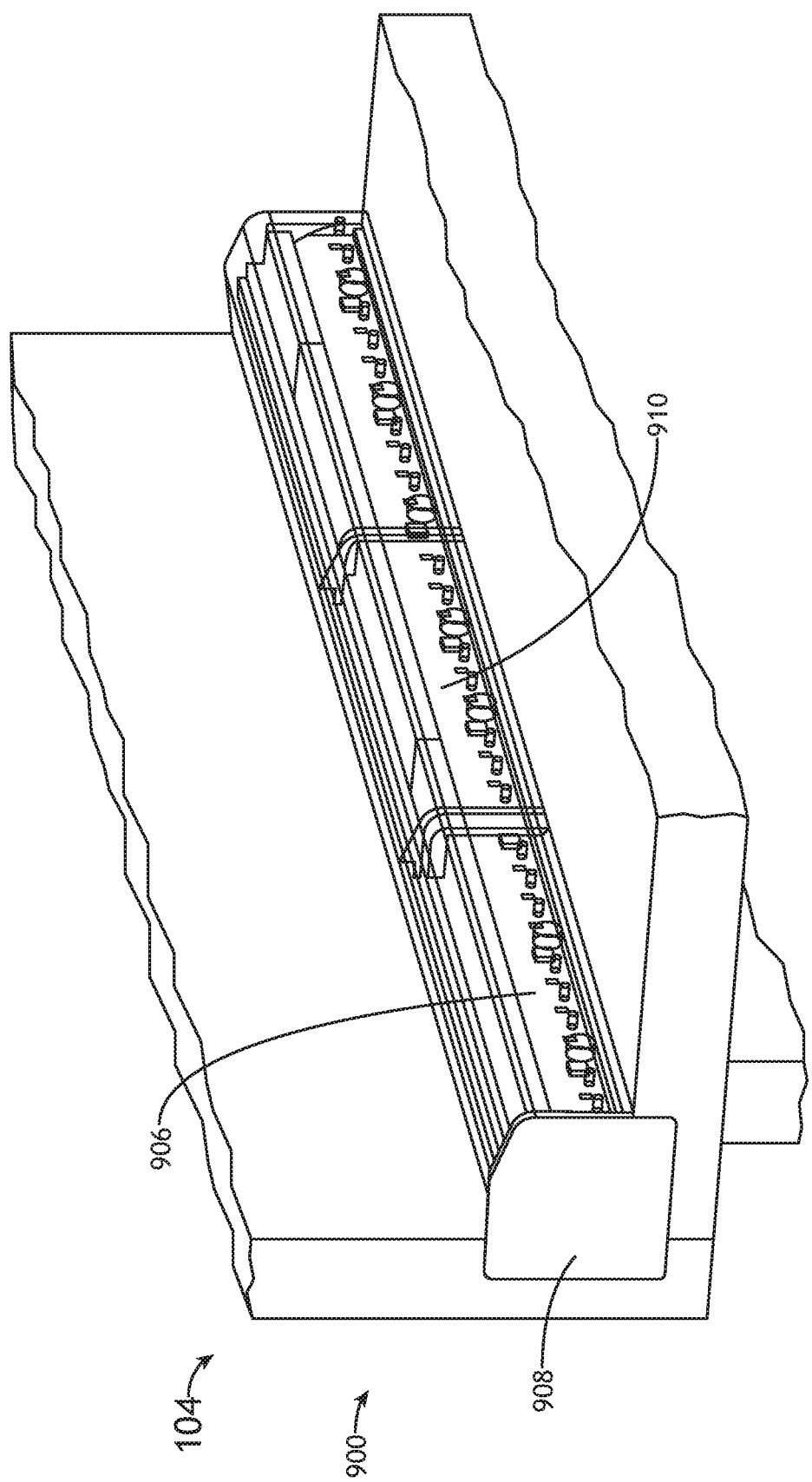
FIG. 9B illustrates a conceptual diagram of an item detector including a light detector, in accordance with one or more embodiments of the present disclosure.

FIG. 9B illustrates a conceptual diagram of an item detector 104 including a light detector 900, in accordance with one or more embodiments of the present disclosure.

As may be seen in FIG. 9B, a base structure 906 including light sources 902 and light sensors 904 may be disposed within a housing 908. In embodiments, the housing 908 may include a diffuser 910 configured to cover at least a portion of the light detector 900. The light detector 900 may be disposed within a stowage area such that light generated by the light sources 902 will be interrupted by items within the stowage area. For example, as shown in FIG. 9B, the light detector 900 may be disposed in a bottom corner of a stowage area adjacent to a bottom surface and a side surface of the stowage area. In this example, light generated by the light sources 902 may be interrupted by items 115 sitting on the bottom surface of the stowage area, and may thereby be identified by the light detector 900.

Figure 9C:
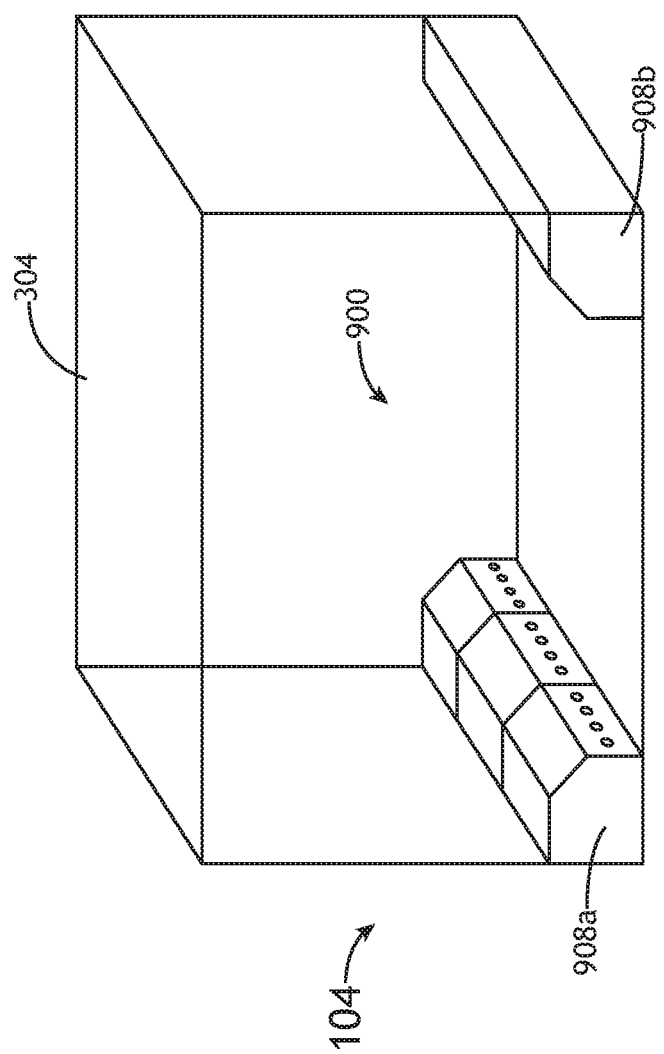
FIG. 9C illustrates a perspective view of a stowage area equipped with an item detector including a light detector, in accordance with one or more embodiments of the present disclosure.

FIG. 9C illustrates a perspective view of a stowage area equipped with an item detector 104 including a light detector 900, in accordance with one or more embodiments of the present disclosure.

As shown in FIG. 9C, a stowage area (e.g., drawer 304) may be equipped with an item detector 104 including a light detector 900. In this regard, a first base structure 906a including a first array of light sources 902 and a first array of light sensors 904 may be disposed within a first housing 908a. Similarly, a second base structure 906b including a second array of light sources 902 and a second array of light sensors 904 may be disposed within a second housing 908b. The light detector 900 may be configured such that the first array of light sources 902 within the first housing 908a are configured to direct light to the second array of light sensors 904 within the second housing 908b, and the second array of light sources 902 within the second housing 908b are configured to direct light to the first array of light sensors 904 within the second housing 908a. In an additional and/or alternative embodiment, the first base structure 906a disposed within the first housing 908a may include only an array of light sources 902, wherein the second base structure 906b disposed within the second housing 908b may include only an array of light sensors 904.

Figure 9D:
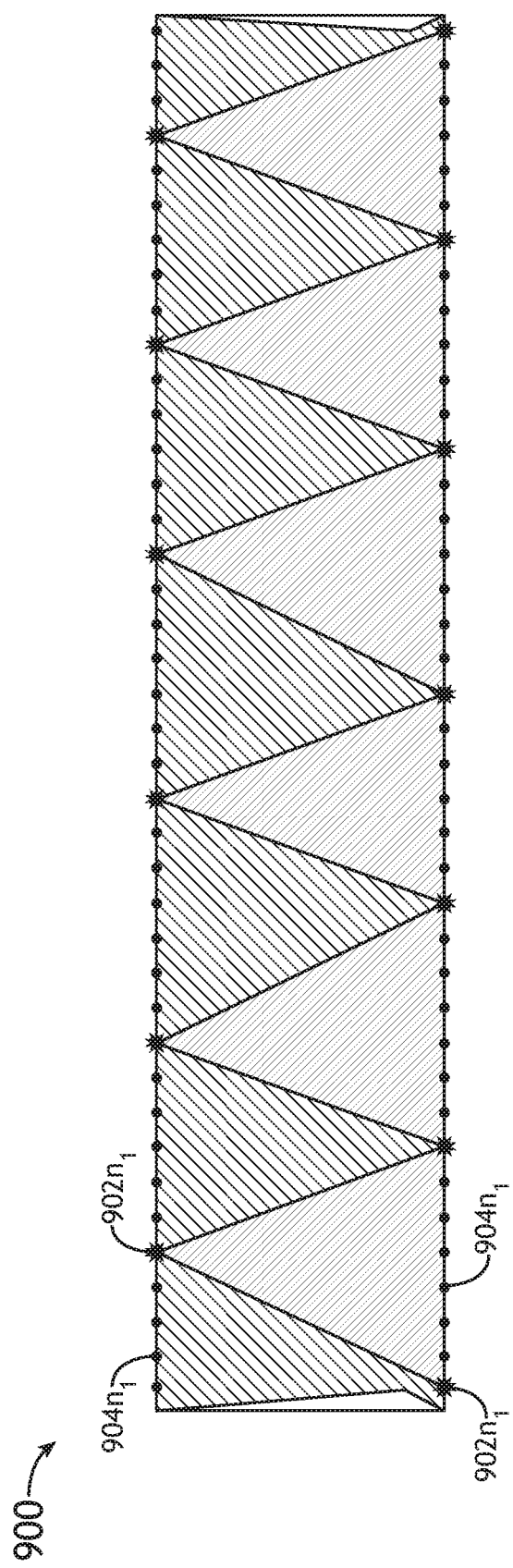
FIG. 9D illustrates a conceptual diagram of an item detector including a light detector, in accordance with one or more embodiments of the present disclosure.

FIG. 9D illustrates a conceptual diagram of an item detector 104 including a light detector 900, in accordance with one or more embodiments of the present disclosure. As may be seen in FIG. 9D, a first array of light sources $902n_1$ may be configured to direct light to a second array of light sensors $904n_2$, and a second array of light sources $902n_2$ may be configured to direct light to a first array of light sensors $904n_i$. It is noted herein that the configuration of light sources 902 and light detectors 904 depicted in FIG. 9D is for illustrative purposes, and is not to be regarded as limiting, unless noted otherwise herein.

Reference will again be made to FIG. 9C. As noted previously herein, items positioned between the first housing 908a and the second housing 908b may decrease light detected by light sensors 904. For example, during a calibration mode when no items are expected to be within a stowage area (e.g., drawer 304), the light detector 900 may determine a calibration value. The calibration value may be determined by measuring a first calibration reading with one or more light sensors 904 while one or more light sources 902 are inactive (e.g., "off"). A second calibration reading may then be taken by measuring a second calibration reading while the one or more light sources 902 are active (e.g., "on"). The difference between the first calibration reading and the second calibration reading may be determined to be the calibration value, which may be stored in memory. In this regard, a calibration value may comprise a metric associated with the light detected by the one or more light sensors 904 (e.g., phototransistors) including, but not limited to, an induced voltage value, an induced current value, and the like. Due to the fact that no items are likely to be within the drawer 304 during a calibration mode, there would be no items to disrupt light generated by the light sources 902, and the determined calibration value would likely be high.

Continuing with the same example, during a check mode, the light detector 900 may be configured to determine a check value. The check value may be determined by measuring a first check reading with one or more light sensors 904 while one or more light sources 902 are inactive (e.g., "off"). A second check reading may then be taken by measuring a second check reading while the one or more light sources 902 are active (e.g., "on"). The difference between the first check reading and the second check reading may be determined to be the check value, which may be stored in memory. In the event an item (e.g., forgotten item 115) is forgotten within the drawer 304, the item would interrupt light directed from the light sources 902 to the light sensors 904, thereby decreasing the light detected by the light sensors 904 in the second check reading, and decreasing the determined check value. If a difference value (e.g., difference between light detected in a calibration value and light detected in a check value) is greater than a threshold value, the one or more processors 108 may be configured to generate one or more found item signals.

In additional and/or alternative embodiments multiple calibration values and multiple check values may be determined by the light detector 900. For example, during a calibration mode, calibration values may be determined for each light sensor 904 of a light detector 900. For instance, during a calibration mode, a first light sensor 904a may determine a first calibration value, a second light sensor 904b may determine a second calibration value, and the like. Similarly, check values may be determined for each light sensor 904. In this regard, a difference value may be determined for each light sensor 904, such that a first difference value represents a change in voltage in the first light sensor 904a, a second difference value represents a change in voltage in the second light sensor 904b, and the like. It is contemplated that all difference values may be compared to a single threshold value and/or multiple threshold values. For instance, the difference value for each light sensor 904 may be compared to a threshold value which is specific to the particular light sensor 904. In this example, the one or more processors 108 may be configured to identify a forgotten item 115 if one or more of the difference values corresponding to the light sensors 904a-904n are greater than one or more corresponding threshold values.

It is contemplated herein that calibration values, check values, and/or difference values may be determined at regular, irregular, and/or random intervals throughout all or a portion of a calibration mode 202 and a check mode 206, respectively. For example, check values and difference values may be calculated every second throughout a check mode 206. By way of another example, check values and difference values may be calculated every 0.2 seconds throughout a check mode 206. For instance, an item 115 may be within a stowage area at a first time period within a check mode 206. At this first time period, the difference value may be greater than a threshold value, which causes system 100 to identify a forgotten item and report the item on display 112, 122. The passenger may subsequently remove the item such that, at a second time period within the check mode 206, the difference value may be less than the threshold value. In this example, the system 100 may be configured to identify that the forgotten item 115 has been retrieved, and the one or more processors 108 may be configured to cause the display 112, 122 to stop reporting the forgotten item 115.

Figure 9E:
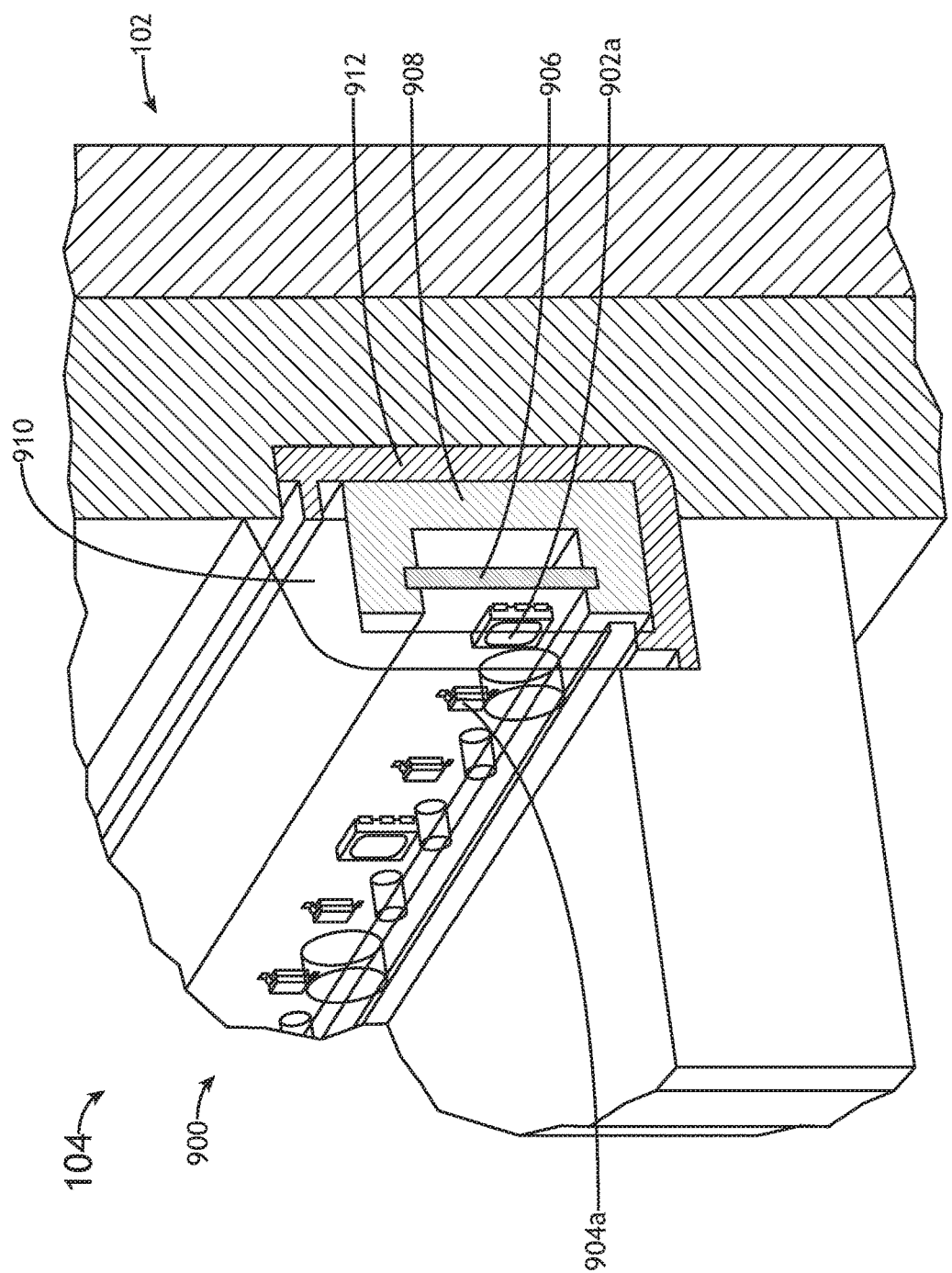
FIG. 9E illustrates a cross-sectional view of a light detector, in accordance with one or more embodiments of the present disclosure.

FIG. 9E illustrates a cross-sectional view of a light detector, in accordance with one or more embodiments of the present disclosure.

As noted previously, one or more light sources 902 and/or one or more light sensors 904 may be disposed on a base structure 906 (e.g., printed circuit board). The base structure 906 may be disposed within a housing 908 which is mounted within a stowage area via mounting channel 912. It is noted herein that ambient light may negatively affect the sensitivity of light detector 900. For example, ambient light may be detected by the light sensors 904 and interpreted as light from the light sources 902. This may cause the light detector 900 to incorrectly determine higher calibration and check values, and thereby fail to identify forgotten items. In this regard, light detector 900 may include a diffuser 910. The diffuser 910 may be configured to shield the base structure 906 in order to prevent excess light from being detected by the light sensors 904. It is contemplated herein that the diffuser 910 may include a filter which is configured to allow only particular wavelengths of light to pass through. For instance, if the light sources 902 operated in the IR wavelength range, the diffuser 910 may be configured to allow only IR wavelengths to pass. It is further contemplated herein that the diffuser 910 may be flush or substantially flush with a surface of a stowage area in order to protect and conceal the light detector 910.

Figure 9F:
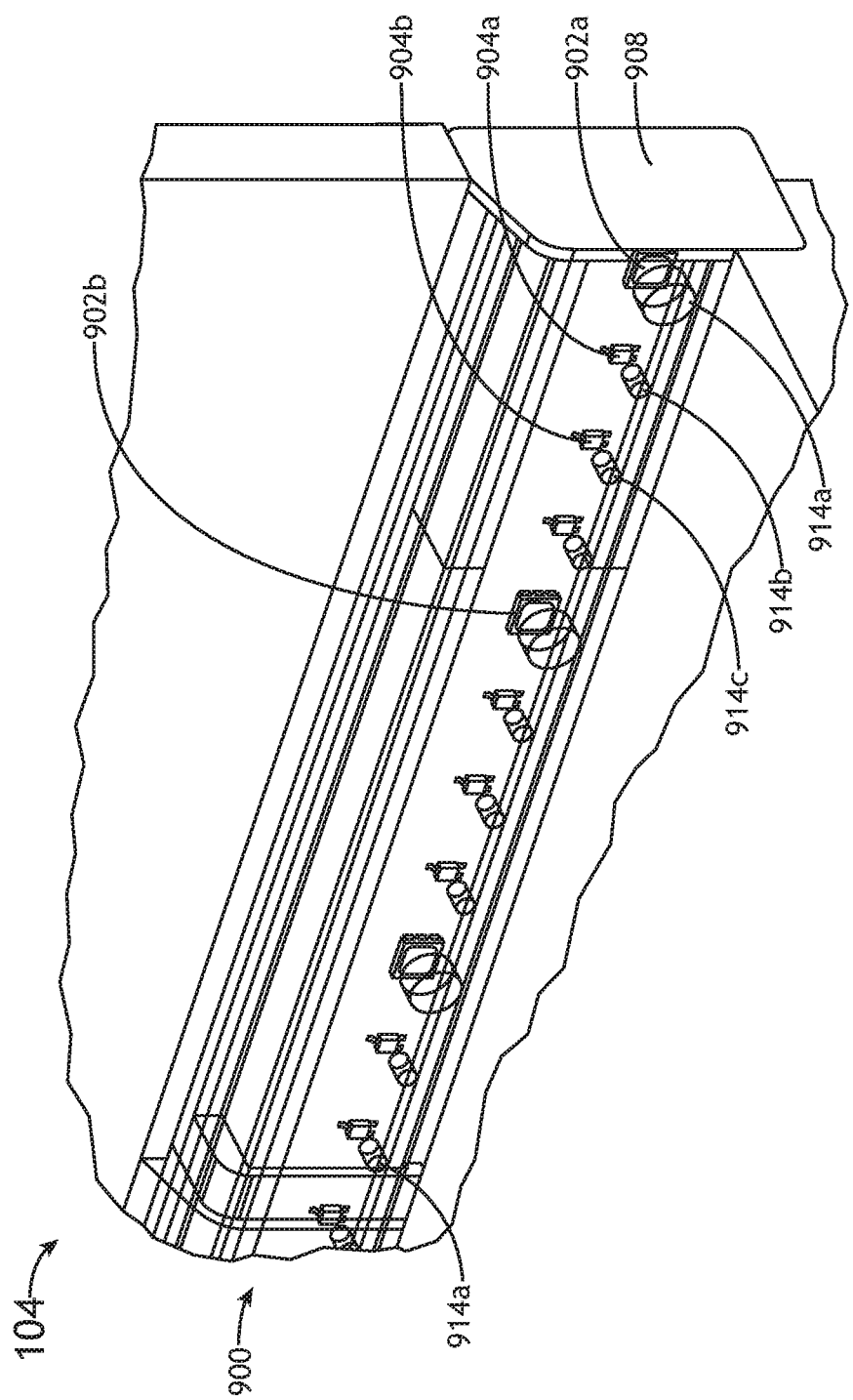
FIG. 9F illustrates a perspective view of a light detector, in accordance with one or more embodiments of the present disclosure.

FIG. 9F illustrates a perspective view of a light detector 900, in accordance with one or more embodiments of the present disclosure.

In embodiments, diffuser 910 may include one or more apertures 914. The one or more apertures 914 may be positioned adjacent to the one or more light sources 902 and/or the one or more light sensors 904 such that the apertures 914 are configured to allow light to pass through from the one or more light sources 902 to the one or more light sensors 904. The apertures 914 may include any structure known in the art configured to allow the passage of light including, but not limited to, one or more holes, one or more ports, one or more windows, one or more lenses, one or more filters, one or more polarizers, and the like. It is contemplated herein that a diffuser 910 with one or more apertures 914 may allow for light to be transmitted to and from the light sources 902 and light sensors 904, while minimizing the interference from ambient light. By limiting the field of view of the light sensors 904 with the diffuser 910 and/or apertures 914, the amount of ambient light which is detected by the light sensors 904 may be decreased, thereby increasing the efficiency and sensitivity of the light detector 900.

Figure 10:
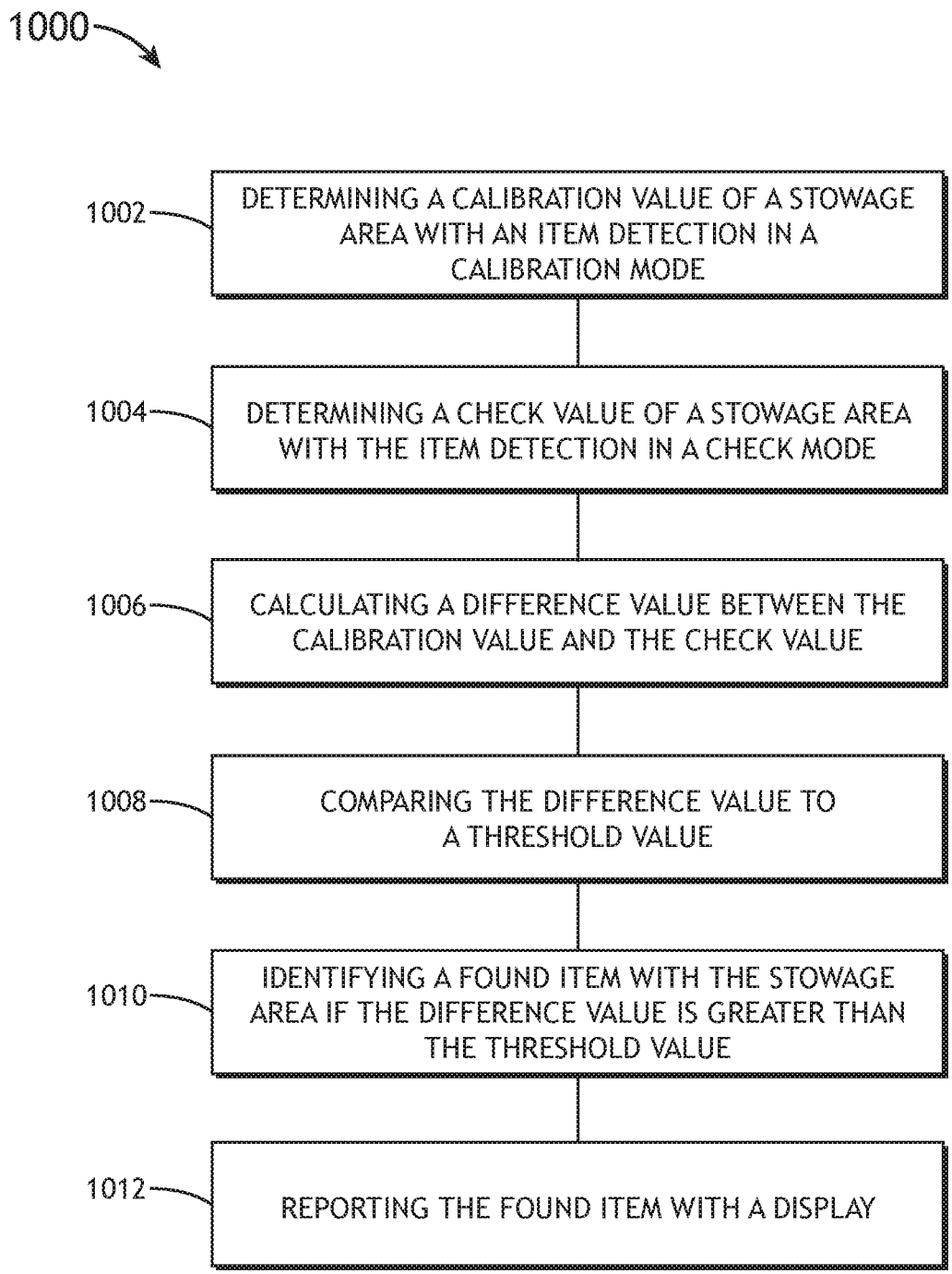
FIG. 10 illustrates a flowchart of a method for identifying items in a stowage area, in accordance with an example embodiment of the present disclosure.

FIG. 10 illustrates a flowchart of a method 1000 for identifying items in a stowage area, in accordance with an example embodiment of the present disclosure. It is noted herein that the steps of method 1000 may be implemented all or in part by system 100. It is further recognized, however, that the method 1000 is not limited to the system 100 in that additional or alternative system-level embodiments may carry out all or part of the steps of method 1000.

In step 1002, a calibration value of a stowage area is determined with an item detector in a calibration mode. As noted previously herein, an item detector 104 may include, but is not limited to, a camera, an ultrasonic sensor, a scanning laser, a strain gauge, a force sensor, a light detector, and the like. In this regard, the form of the calibration value may vary depending on the type of item detector 104 at issue. For example, in the case of an item detector 104 comprising a camera 400, the calibration value may include a calibration image. By way of another example, in the case of a force sensor 800, the calibration value may include a voltage induced by a force exerted on the force sensor 800. By way of another example, in the case of a light detector 900, the calibration value may include a voltage induced by light incident on a light sensor 904 of the light detector 900.

In step 1004, a check value of a stowage area is determined with the item detector in a check mode. It is noted herein that a calibration value and a check value may be determined for one or more separate stowage areas of a passenger cabin 101.

In step 1006, a difference value between the calibration value and the check value is calculated. For example, the one or more processors 108 may be configured to receive the calibration value and the check value and calculate a difference value. In this regard, the form of the difference value may be dependent upon the form of the calibration value and the check value. The form of the difference value may therefore be dependent upon the type of item detector 104 at issue. For example, in the case of a light detector 900, a difference value may include a difference between induced voltages on a light sensor 904 during a calibration mode and a check mode. By way of another example, in the case of a camera 400, a difference value a difference value may include any metric which is indicative of a level of similarity or difference between a calibration image and a check image.

In a step 1008, the difference value is compared to a threshold value. The threshold value may be in the same form as the respective difference value. In a step 1010, a found item is identified within the stowage area if the difference value is greater than the threshold value. For example, in the case of a light detector 900, a forgotten item within the stowage area may decrease the check value (e.g., induced voltage) of the light detector 900 in the check mode relative to the calibration value. This decrease may result in a difference value being greater than the threshold value of the light detector 900, thereby indicating the presence of an item within the stowage area.

In a step 1012, a found item is reported on a display. For example, a display 112 and/or a display 122 may be configured to report the found item to a passenger and/or flight personnel. The display 112 and/or display 122 may be configured to indicate the presence of a forgotten item in any manner known in the art including, but not limited to, a typed/written message, blinking lights, visual cues, audio cues, haptic feedback, and the like.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
   one or more item detectors configured to determine a calibration value of a stowage area in a calibration mode, and determine a check value of the stowage area in a check mode; and
   a controller configured to:
   receive the calibration value and the check value from the one or more item detectors;
   calculate a difference value between the calibration value and the check value;
   compare the difference value to a threshold value; and
   generate one or more found item signals if the difference value is greater than the threshold value.

2. The system of claim 1, wherein the one or more item detectors comprise one or more cameras.

3. The system of claim 1, wherein the one or more item detectors comprise one or more ultrasonic sensors.

4. The system of claim 1, wherein the one or more item detectors comprise one or more scanning lasers.

5. The system of claim 1, wherein the one or more item detectors comprise one or more strain gauges.

6. The system of claim 1, wherein the one or more item detectors comprise one or more force sensor resistors.

7. The system of claim 1, wherein the one or more item detectors comprise one or more light detectors.

8. The system of claim 7, wherein the one or more light detectors comprise one or more light emitting diodes (LEDs) configured to direct light to one or more light phototransistors.

9. The system of claim 8, wherein a calibration value and a check value are determined for at least one photoresistor of the one or more photoresistors.

10. The system of claim 9,
wherein the calibration value comprises the difference between a first phototransistor reading and a second phototransistor reading, wherein the first phototransistor reading is determined when the one or more LEDs are an active state, and the second phototransistor reading is determined when the one or more LEDs are an inactive state,
wherein the check value comprises the difference between a third phototransistor reading and a fourth phototransistor reading, wherein the third phototransistor reading is determined with the one or more LEDs in an active state, and the fourth phototransistor reading is determined with the one or more LEDs in an inactive state.

11. The system of claim 1, further comprising a display communicatively coupled to the controller, the display configured to report a found item in response to the one or more found item signals.

12. The system of claim 1, wherein the stowage area comprises an aircraft stowage area.

13. The system of claim 12, wherein the stowage area of the aircraft compartment comprises at least one of an overhead compartment, a wardrobe, a drawer, an ottoman stowage compartment, an under-seat compartment, a credenza pocket, and a seat back pocket.

14. A system, comprising:
a passenger cabin;
a plurality of stowage areas in the passenger cabin, at least one stowage area of the plurality of stowage areas including one or more item detectors, the one or more item detectors configured to determine a calibration value of the at least one stowage area in a calibration mode, and determine a check value of the at least one stowage area in a check mode; and
a controller configured to:
receive the calibration value and the check value from the one or more item detectors;
calculate a difference value between the calibration value and the check value;
compare the difference value to a threshold value; and
generate one or more found item signals if the difference value is greater than the threshold value.

15. The system of claim 14, wherein the one or more item detectors comprise at least one of: one or more cameras, one or more ultrasonic sensors, one or more scanning lasers, one or more strain gauges, or one or more force sensors.

16. The system of claim 14, wherein the one or more item detectors comprise one or more light detectors.

17. The system of claim 16, wherein the one or more light detectors comprise one or more light emitting diodes (LEDs) configured to direct light to one or more light phototransistors.

18. The system of claim 17, wherein a calibration value and a check value are determined for at least one photoresistor of the one or more photoresistors.

19. The system of claim 18,
wherein the calibration value comprises the difference between a first phototransistor reading and a second phototransistor reading, wherein the first phototransistor reading is determined with the one or more LEDs in an active state, and the second phototransistor reading is determined with the one or more LEDs in an inactive state,
wherein the check value comprises the difference between a third phototransistor reading and a fourth phototransistor reading, wherein the third phototransistor reading is determined with the one or more LEDs in an active state, and the fourth phototransistor reading is determined with the one or more LEDs in an inactive state.

20. A method, comprising:
determining a calibration value of a stowage area with an item detector in a calibration mode;
determining a check value of the stowage area with the item detector in a check mode;
calculating a difference value between the calibration value and the check value;
comparing the difference value to a threshold value;
identifying a found item within the stowage area if the difference value is greater than the threshold value; and
reporting the found item with a display.

* * * * *